United States Patent
McMahon et al.

(10) Patent No.: US 12,414,645 B2
(45) Date of Patent: Sep. 16, 2025

(54) COLD BREW DEVICES, SYSTEMS AND METHODS

(71) Applicants: Paul Andrew McMahon, Transfer, PA (US); Ryan Christopher Maloney, Chalottesville, VA (US)

(72) Inventors: Paul Andrew McMahon, Transfer, PA (US); Ryan Christopher Maloney, Chalottesville, VA (US)

(73) Assignee: Kevo Brew LLC, Transfer, PA (US)

( * ) Notice: Subject to any disclaimer, the term of this patent is extended or adjusted under 35 U.S.C. 154(b) by 708 days.

(21) Appl. No.: 17/316,674

(22) Filed: May 10, 2021

(65) Prior Publication Data

US 2021/0345816 A1 Nov. 11, 2021

Related U.S. Application Data

(60) Provisional application No. 63/199,890, filed on Feb. 1, 2021, provisional application No. 63/049,027, filed on Jul. 7, 2020, provisional application No. 63/021,681, filed on May 8, 2020.

(51) Int. Cl.
*A47J 31/20* (2006.01)
*A47J 31/06* (2006.01)

(52) U.S. Cl.
CPC ............ *A47J 31/20* (2013.01); *A47J 31/06* (2013.01)

(58) Field of Classification Search
CPC .... A47J 31/3628; A47J 31/3695; A47J 31/38; A47J 31/06; A47J 31/0615; A47J 31/0626; A47J 31/0636; A47J 31/0642; A47J 31/08; A47J 31/10; A47J 31/14; A47J 31/18; A47J 31/20; A47J 31/22; A47J 31/4403; A47J 31/446; A47J 31/0657; A47J 31/0668; A47J 31/0673; A47J 31/0678; A47J 31/085
USPC ...... 99/279, 282–283, 289 R, 290–291, 295, 99/297, 302 R–302 C, 304, 307, 310, 99/316–317, 323
See application file for complete search history.

(56) References Cited

U.S. PATENT DOCUMENTS

| | | |
|---|---|---|
| D661,544 S | 6/2012 | Enghard |
| 8,307,755 B2 | 11/2012 | Shen |
| 8,985,377 B2 | 3/2015 | Lane |
| 9,089,239 B2 | 7/2015 | Billadeau |
| D747,140 S | 1/2016 | Roth et al. |
| 9,314,126 B2 | 4/2016 | Molayem |
| 9,332,873 B2 | 5/2016 | Tien |
| 9,510,705 B2 | 12/2016 | Rolfes et al. |
| 9,801,492 B1 | 10/2017 | Lin |

(Continued)

FOREIGN PATENT DOCUMENTS

| | | |
|---|---|---|
| CN | 105852646 | 8/2016 |
| CN | 207768165 | 8/2018 |

(Continued)

*Primary Examiner* — Sang Y Paik
*Assistant Examiner* — Bonita Khlok
(74) *Attorney, Agent, or Firm* — Jonathan D'Silva; Benjamin Clarke; Penn State Dickinson Law IP Clinic

(57) ABSTRACT

Versatile devices, systems, and methods of cold brewing coffee and/or tea using pre-manufactured disposable coffee-containing cups. Alternatively, coffee or tea may be placed within a meshed container for cold brew. A single mug device and large volume dispensers using the same cold brew technique, which has been shown to produce higher dissolved coffee/tea, resulting in a higher quality beverage.

17 Claims, 45 Drawing Sheets

(56) References Cited

U.S. PATENT DOCUMENTS

| | | | |
|---|---|---|---|
| 9,877,607 B2 | 1/2018 | Beckman et al. | |
| 9,901,167 B2 | 2/2018 | Anderson | |
| D815,895 S | 4/2018 | Roth et al. | |
| D823,052 S | 7/2018 | Neace, Jr. | |
| D823,053 S | 7/2018 | Neace, Jr. | |
| 10,149,568 B2 | 12/2018 | Shen | |
| 10,299,633 B2 | 5/2019 | Shaw | |
| 10,405,688 B2 | 9/2019 | Lin | |
| 10,463,190 B2 | 11/2019 | Hambly et al. | |
| D876,887 S | 3/2020 | Barber | |
| 10,588,448 B2 | 3/2020 | Lin | |
| D882,338 S | 4/2020 | Bellman | |
| 2010/0263549 A1 | 10/2010 | Lee | |
| 2014/0072684 A1* | 3/2014 | Madden | A47J 31/005 |
| | | | 426/431 |
| 2014/0224725 A1 | 8/2014 | Uspenski et al. | |
| 2015/0175347 A1* | 6/2015 | Empl | A23C 9/1508 |
| | | | 426/433 |
| 2015/0282664 A1* | 10/2015 | Savage | A23F 5/262 |
| | | | 426/431 |
| 2017/0265674 A1 | 9/2017 | Liu | |
| 2017/0334636 A1* | 11/2017 | Park | B65D 85/8043 |
| 2019/0002192 A1* | 1/2019 | Wicks | A47J 31/407 |
| 2019/0200800 A1 | 7/2019 | Redington | |
| 2020/0008605 A1 | 1/2020 | Maloni et al. | |
| 2020/0039738 A1* | 2/2020 | Duman | A47G 19/2272 |
| 2020/0154930 A1* | 5/2020 | Rivera | A47J 31/4457 |
| 2020/0297153 A1* | 9/2020 | Jacobs | A47J 31/5253 |
| 2022/0125234 A1* | 4/2022 | Richardson | A23F 5/262 |

FOREIGN PATENT DOCUMENTS

| | | |
|---|---|---|
| CN | 109619945 | 4/2019 |
| CN | 110960041 | 4/2020 |
| DE | 202018103516 | 1/2019 |
| FR | 3082716 | 5/2020 |
| KR | 200364716 | 10/2004 |
| KR | 20140082912 | 7/2014 |
| KR | 200475003 | 11/2014 |
| WO | WO 2019243397 | 12/2019 |

\* cited by examiner

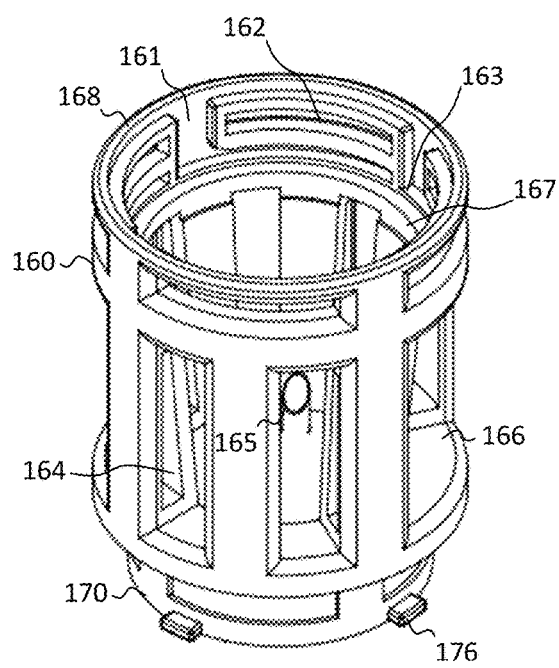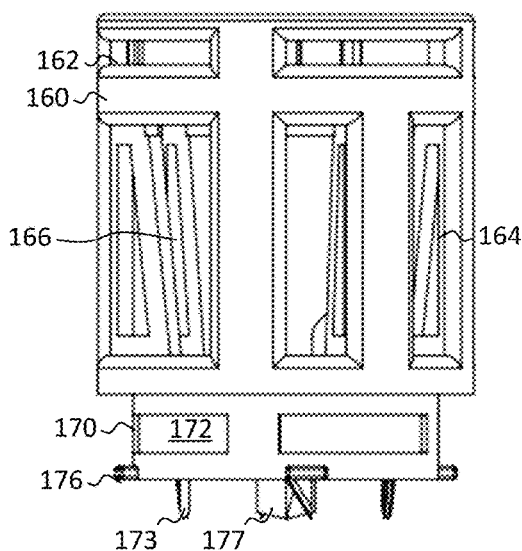
FIG. 8A
FIG. 8B
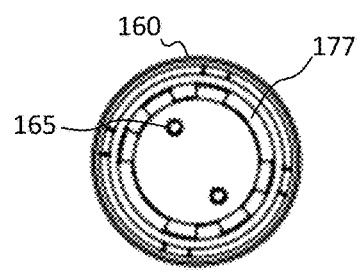
FIG. 8C

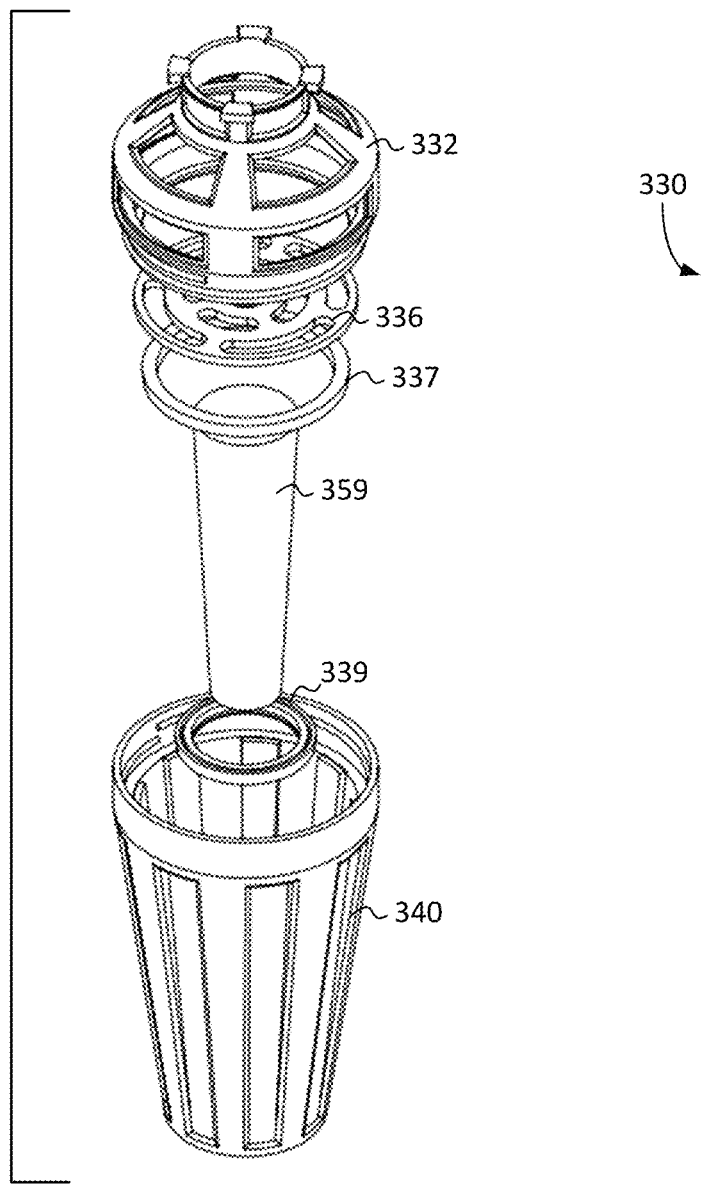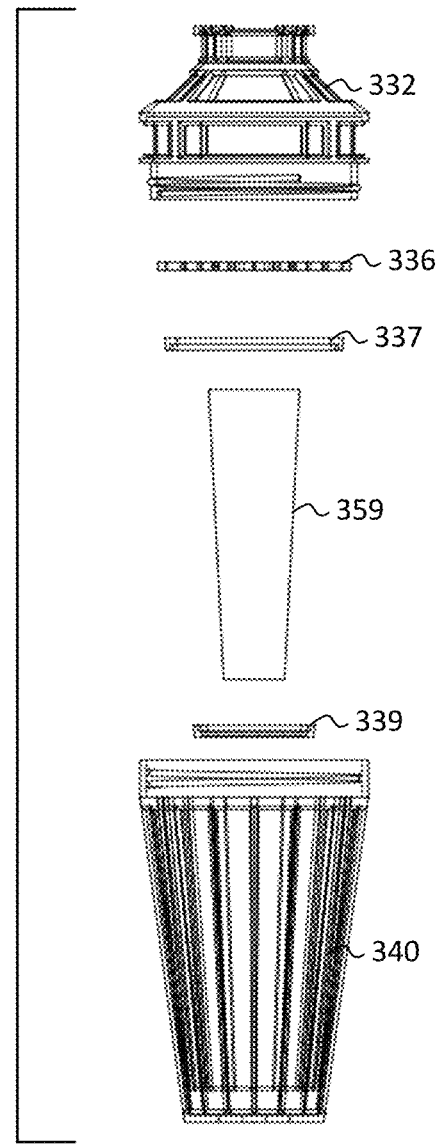
FIG. 34A
FIG. 34B
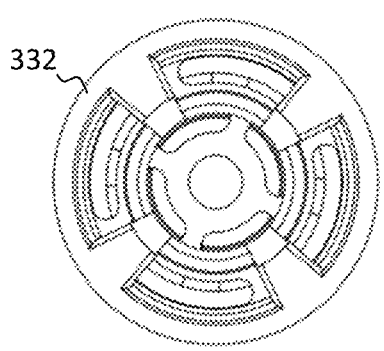
FIG. 34C

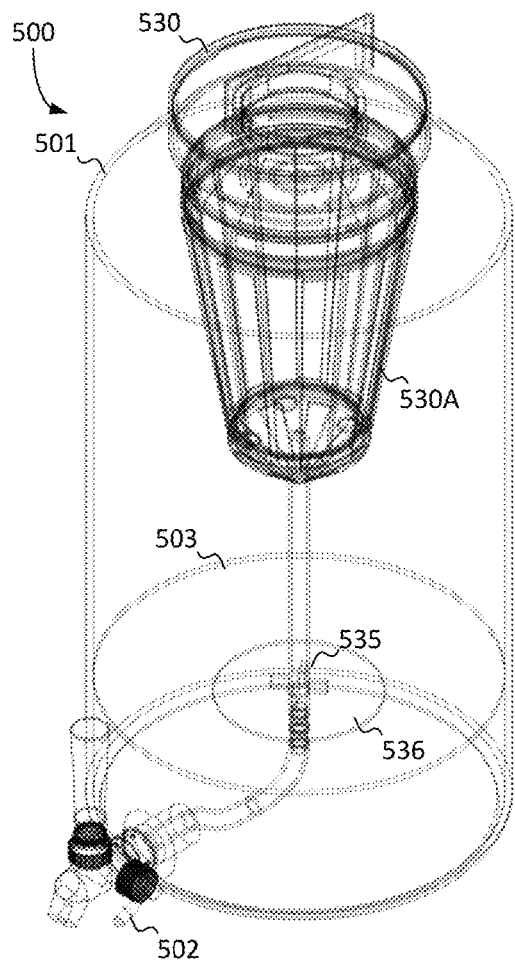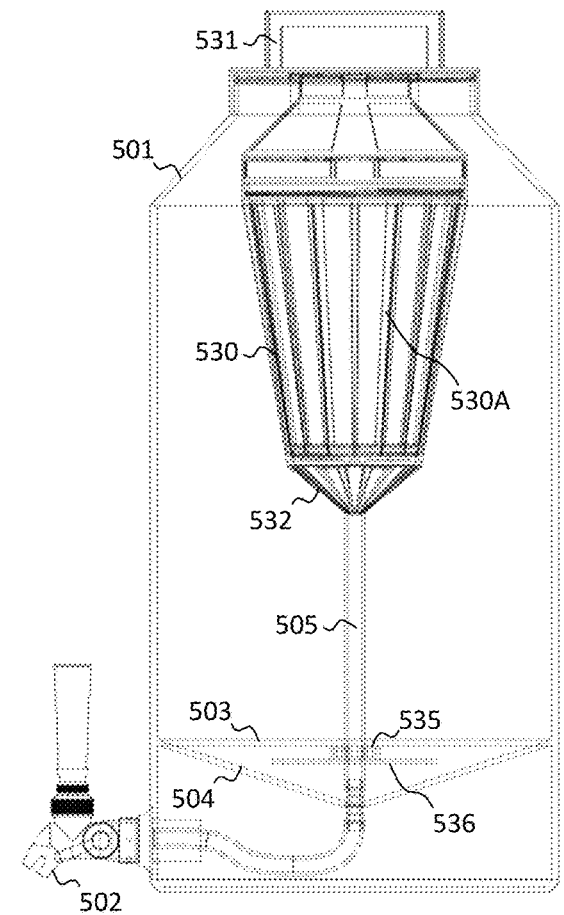
FIG. 36A
FIG. 36B
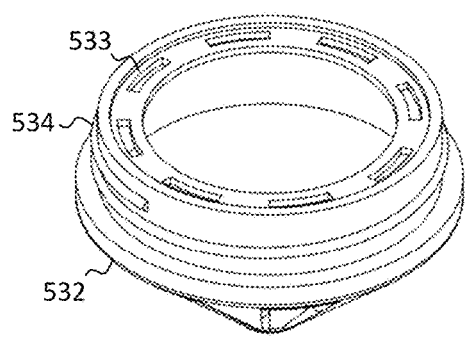
FIG. 36C

COLD BREW DEVICES, SYSTEMS AND METHODS

This Patent Application claims priority to U.S. Provisional Patent Application Ser. No. 63/199,890, filed Feb. 1, 2021; and to U.S. Provisional Patent Application Ser. No. 63/049,027, filed Jul. 7, 2020; and to U.S. Provisional Patent Application Ser. No. 63/021,681, filed May 8, 2020; the contents of which are hereby incorporated by reference herein in their entirety into this disclosure.

BACKGROUND OF THE SUBJECT DISCLOSURE

Field of the Subject Disclosure

The present subject disclosure relates to cold brew devices, systems, and methods. More specifically, the present subject disclosure relates to devices, systems, and methods to produce high quality cold brewed coffee or tea for an individual size or in larger volumes.

Background of the Subject Disclosure

Coffee and tea consumption spans across every culture and corner of the globe. The traditional hot cup of coffee or tea is ubiquitous is a stable morning ritual in virtually all regions of the world. It provides a distinct and satisfying taste to billions of drinkers every day.

Coffee or tea is typically brewed in a pot using hot water exposed to coffee grounds or tea leaves. In both cases, water or milk is contacted with the grounds or leaves, which are filtered from the brewed beverage so that the brewed beverage may be consumed without the grinds or leaves. More modern techniques have used single serving cups or containers that allow a brewing system to access the coffee or tea within the single serving cup, and then dispense the hot brewed beverage into a serving container. These modern systems generally utilize disposable single serving containers which are pre-manufactured with a given volume of ground coffee or tea, which are suitable for the single use hot brew systems.

A less conventional, but increasingly popular method for preparing coffee is the cold brew technique, which has become a popular alternative to the traditional hot coffee. Cold brew coffee offers a less acidic, more flavorful alternative to traditionally brewed hot coffee. In warm or hot weather, it is a perfectly refreshing beverage to consume in an outdoor environment.

However, the conventional cold brew method of preparing coffee is very time consuming and requires costly special equipment, which does not provide the same convenience and flexibility of preparing a single cup of hot coffee.

SUMMARY OF THE SUBJECT DISCLOSURE

The present subject disclosure introduces an easy to use, versatile, inexpensive, and portable option to create cold-brew coffee at home/office using widely available disposable single serve coffee cups. Although there are conventional systems available for making cold brew coffee at home, none provide the simple elegance and versatility of the present subject disclosure which, among other things, utilizes one or two disposable single serve coffee cups. The present subject disclosure provides specialized beverage containers, baskets, filters, and techniques which produce a superior quality beverage. The present subject disclosure uses the same unique techniques to describe countertop systems which produce cold brewed beverages at greater volumes than for a single service.

In one exemplary embodiment, the present subject disclosure is a device. The device includes a container; a lid that is attachable to the container; and a basket securable to the lid and positioned inside the container, the basket adapted to hold coffee grinds or tea leaves.

In another exemplary embodiment, the present subject disclosure is a system. The system includes a container; a basket securable to and positioned inside the container, the basket adapted to hold coffee grinds or tea leaves; and a dispenser adapted to remove brewed beverage from a bottom of the container.

In another exemplary embodiment, the present subject disclosure is a method of brewing a beverage. The method includes providing a container with a certain volume of fluid, providing a basket containing raw material for a beverage; securing the basket inside the container such that all portions of the raw material are submerged within the fluid; and allowing the cyclic downward flow of fluid through the basket and through the raw material to create a brewed beverage at a bottom of the container.

BRIEF DESCRIPTION OF THE DRAWINGS

FIG. 8A shows a perspective view of an upper holder and lower slicer, according to an exemplary embodiment of the present subject disclosure.

FIG. 8B shows a side view of an upper holder and lower slicer, according to an exemplary embodiment of the present subject disclosure.

FIG. 8C shows a top view of an upper holder and lower slicer, according to an exemplary embodiment of the present subject disclosure.

FIG. 34A shows a perspective view of a basket assembly, according to an exemplary embodiment of the present subject disclosure.

FIG. 34B shows a side view of a basket assembly, according to an exemplary embodiment of the present subject disclosure.

FIG. 34C shows a top view of a basket assembly, according to an exemplary embodiment of the present subject disclosure.

FIG. 36A shows a perspective view of a countertop brew system, according to an exemplary embodiment of the present subject disclosure.

FIG. 36B shows a side view of a countertop brew system, according to an exemplary embodiment of the present subject disclosure.

FIG. 36C shows a perspective view of a conical cap, according to an exemplary embodiment of the present subject disclosure.

FIG. 42B shows simulation testing an open system at 5 minutes, according to an exemplary embodiment of the present subject disclosure.

FIG. 43A shows simulation testing a closed system at 10 minutes, according to an exemplary embodiment of the present subject disclosure.

FIG. 43B shows simulation testing an open system at 10 minutes, according to an exemplary embodiment of the present subject disclosure.

FIG. 44A shows simulation testing a closed system at 20 minutes, according to an exemplary embodiment of the present subject disclosure.

FIG. 44B shows simulation testing an open system at 20 minutes, according to an exemplary embodiment of the present subject disclosure.

FIG. 45A shows simulation testing a closed system at 30 minutes, according to an exemplary embodiment of the present subject disclosure.

FIG. 45B shows simulation testing an open system at 30 minutes, according to an exemplary embodiment of the present subject disclosure.

DETAILED DESCRIPTION OF THE SUBJECT DISCLOSURE

Figure 1A:
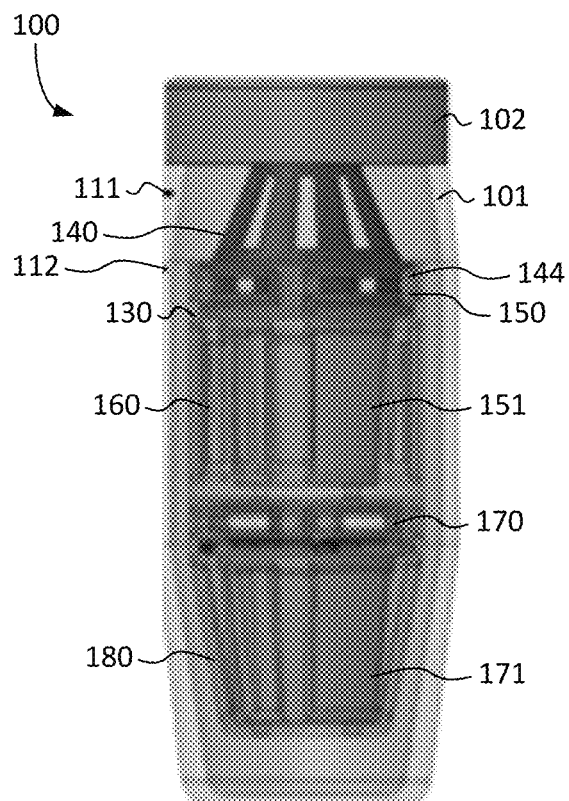
FIG. 1A shows a side view of device with a lid for cold brew, according to an exemplary embodiment of the present subject disclosure.

The present subject disclosure addresses the shortcomings of conventional cold coffee or tea brewing systems. The present disclosure provides the user options to brew with either single serve coffee cups or free coffee grounds. Existing cold brew baskets require the user to shake, stir or pour the water over the grounds to moisten. The present subject disclosure features air escape filters which eliminate the need for any additional agitation or stimulation. Numerous coffee and tea basket designs exist in the cold brew and hot brew market, such as open immersion baskets, pour over, drip, and pressurized water such as espresso. The present closed basket combines the benefits of an immersion basket with that of the pour over or drip devices. The present systems also produce a cold-brew coffee in which the high quality (defined as high dissolved solids) coffee is efficiently separable from the brewing water, and later drawn off without being diluted after mixing.

Devices, systems, and methods according to the present subject disclosure allow users to create cold brew coffee for a single serving using the popular disposable single serve coffee cups. The mug portion of the subject disclosure may be used for other general drinking purposes, including traditional hot coffee, although its unique design and intended purpose is to house the novel brewing basket assembly, which makes use of disposable single serve coffee cups. The mug portion has been designed to be compatible with existing single-serve coffee brewing machine cups, such as, for example, the K-CUP by KEURIG, and others.

The present subject disclosure allows users many options and capabilities to brew coffee or tea for personal use. The present subject disclosure provides the ability for users to make cold brew coffee using disposable single serve coffee cups. Further, users can make personal cold brew beverages using coffee or tea grounds designed for hot brew, gravity fed, traditional coffee machines. Users are also able to mix flavors available in disposable single serve coffee cups. Users do not have to shake, stir, or pour water over coffee grounds using the present system, thereby simplifying the process. Users have the ability to naturally brew the highest quality beverage possible (as defined by high percentage of dissolved solids) through natural density-driven gravitational currents of the water, particularly in cold water, without the use of external pressurized water by maximizing the benefits of Le Chatelier's Principle. Other unique attributes of the present subject disclosure will be appreciated by one having ordinary skill in the art and are within the scope of the present disclosure.

The present subject disclosure shows by examples uniquely designed coffee and tea baskets and their ability to brew coffee or tea from any grounds in a portable mug device. The present subject disclosure also describes unique coffee and tea filters and the ability to filter out air and other gases trapped in the filter contents. The devices, systems and methods according to the present subject disclosure describe coffee and tea brewing methods and the ability to maximize high quality (high dissolved solids) naturally. However, the present techniques are not limited to coffee or tea but may be used with any other material that produces a beverage. Other examples include, but are not limited to, natural or artificial flavored drinks, protein drinks, medicines, etc. The use of coffee and tear are mere examples, and the full scope of the use of the present techniques would be appreciated by one having ordinary skill in the art after consideration of the present disclosure.

Devices, systems and methods according to the present subject disclosure provide novel techniques to brew beverages (e.g., coffee, tea, etc.) at home, office, travel, commercial settings, etc. The versatility of the present systems and methods are presented by the examples shown and described. It should be noted that each example has been shown with unique or distinct features or elements. However, such features or elements are not limited to the specific example shown, but may be interchanged or substituted into other examples shown and described. There are countless variations and combinations of the elements as described in the examples below, and for sake of brevity, only a few examples are presented. One having ordinary skill in the art would appreciate that elements of one example may be interchanged or substituted into other examples to produce a unique desired combination, which are within the scope of the present disclosure.

The examples presented herein provide for four general classes of the present subject disclosure: (1) a reusable beverage mug (FIGS. 1-11); with various additional exemplary embodiments (FIGS. 12-23); (2) an open basket mug (FIGS. 24-26); (3) a closed basket mug (FIGS. 27-31); with various additional exemplary embodiments (FIGS. 32-34); and (4) countertop models for personal/commercial environments (FIGS. 35-38). Finally, FIG. 39 shows testing results, and FIGS. 40-45 show various fluid simulations.

The first class of brew devices, systems, and methods (FIGS. 1-11) includes a reusable coffee mug for making cold-brew beverages using single serve coffee/tea cups. An exemplary device uses one or two single serve coffee cups, pierced through two holes in the bottom and four slices on top, housed in a filtered assembly attached to the mug's lid, then submerged in water for a period of time. The user can use the mug with or without the assembly remaining inside after brewing. The assembly can be removed and the mug used generally for any standard beverage.

The second class of brew devices, systems, and methods (FIGS. 12-14) includes an open-basket design which allows the user to cold-brew coffee using traditional coffee grounds in a portable mug. An additional air escape filter allows users to submerge the open basket into water without the need to shake, stir, or directly pour water over the grounds to moisten them.

The third class of brew devices, systems, and methods (FIGS. 15-19) is a closed basket design which allows users to utilize and maximize Le Chatelier's Principle, to naturally brew the highest total dissolved solids (TDS) possible without the use of external pressurized water, and without immersion in the reaction products, which function to slow the continued reaction down. All chemical reactions and physical changes are reversible by nature. Statistically, they tend to shift more one way or another based on if they are a spontaneously endothermic or exothermic. The dissolving of coffee reactants is a spontaneously endothermic process that seeks to remove heat from the surroundings. The equation can be simplified to:

Heat+Water+Coffee Solubles ⇌ TDS (Total Dissolved Solids)+Water.

TDS, which includes the caffeine compound, can be maximized by shifting the equilibrium further to the right into making more products. The present closed immersion design maximizes the three equilibrium factors of concentration, pressure, and temperature. By maximizing these equilibrium factors, according to Le Chatelier's Principle, the reaction will shift to making more TDS. Experimental data has shown that the present design does slow the reaction down for temperatures that approach freezing, with maximum TDS occurring at temperatures slightly above freezing. It has been shown that the addition of heat creates convection currents that disrupt the deposition of TDS on the bottom of the container, despite the increased reaction rate benefitting the rate at which TDS are generated.

The present system also enhances the quality of the brewed beverage by utilizing Toricelli's Law to enhance flow during brewing. Toricelli's Law is a fluid dynamics concept that relates the amount of time it takes to drain a "tank" (simulated by the internal basket containing high-density coffee products) to the vertical displacement of the center of gravity of the fluid inside, given that the tank opening is at the bottom. According to conservation of energy for a free-falling object:

$$mgh = \frac{1}{2}mv^2$$

The exit velocity of the fluid can thus be proportional to the square root of the vertical displacement, h, according to:

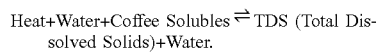

The present subject disclosure in certain embodiments uses a basket that has a conical shape, which minimizes its volume near the exit. It also constricts flow at its exit causing accumulation of coffee products. These two features work together to force accumulated coffee products to be displaced upward, maximizing h and thus v.

A fourth class of brew systems and devices is a higher volume countertop design which may be used for residential/commercial environments and scales up the gravity-driven brewing mechanism found in the single serve coffee cup mug design and allows high-TDS coffee to be drawn off the bottom of a large holding container, with minimal disruption to and dilution of the high TDS coffee present at the bottom of the holding container.

FIGS. 1-11 describe a reusable portable beverage mug, which is especially designed for existing disposable, single use pre-packaged cups containing tea or coffee.

Figure 1B:
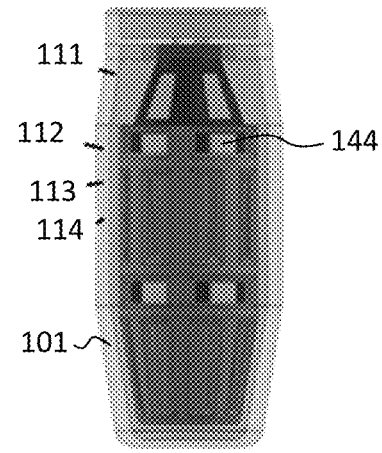
FIG. 1B shows a side view of a device without a lid for cold brew, according to an exemplary embodiment of the present subject disclosure.
Figure 1D:
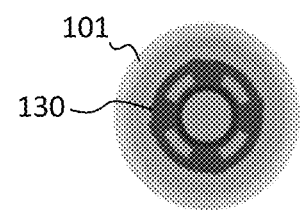
FIG. 1D shows a top view of device for cold brew, according to an exemplary embodiment of the present subject disclosure.
Figure 1C:
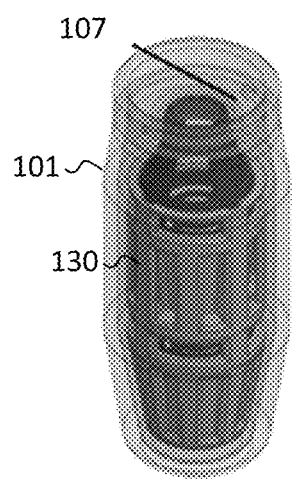
FIG. 1C shows a perspective view of device for cold brew, according to an exemplary embodiment of the present subject disclosure.
Figure 1E:
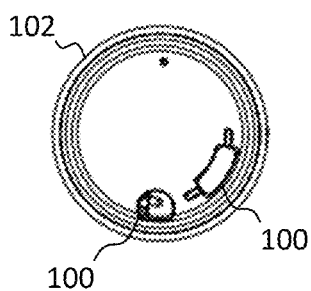
FIG. 1E shows a top view of lid, according to an exemplary embodiment of the present subject disclosure.

FIGS. 1A-1E show various views of a beverage container 100 according to the present subject disclosure. The container 100 includes a mug portion 101 and a lid 102. FIG. 1A shows a closed device with a container 101 and lid 102. FIGS. 1B and 1C show a device with just the container 101 and no lid. FIG. 1D shows a top view of the container 101 with no lid. FIG. 1E shows a top view of the container 101 with a lid 102.

An internal basket assembly 130 is disposed within the container 101 and includes modular components, as will be described in more detail below. The modular components include a spacer 140, an upper slicer 150, upper holder 160, lower slicer 170, and lower holder 180. Upper holder 160 contains an upper cup 151, and lower holder 180 contains a lower cup 171.

The "max fill line" 111, which may be, for example, a 19.3 fluid ounce maximum fill level, accounts for the user filling the mug to the ideal twelve fluid ounce line 113, added to the 7.3 fluid ounces of displacement due to the internal assembly and two air-filled single serve coffee cups 151, 171. The "minimum fill line 112, which may be, for example, a 14.24 fluid ounce minimum fill level, accounts for the user filling the mug to the "strong coffee" ten fluid ounce line 114, added to the 4.24 fluid ounces of displacement due to the internal assembly and two water-filled single serve coffee cups 151, 171, and is positioned such that water will still sit above the upper holder filtration windows 144 during brewing. In use, the internal basket 130 is removed and the container 101 is filled with a fluid (e.g., water) to a point including and between low mark 114 and high mark 113. Then the internal basket assembly 130 is positioned within the container 101, thereby displacing the fluid that was poured into the container 101. The low fill mark 114 to high fill mark 113 range results in a container 101 fill of low mark 112 to high mark 111, respectively.

Figure 2A:
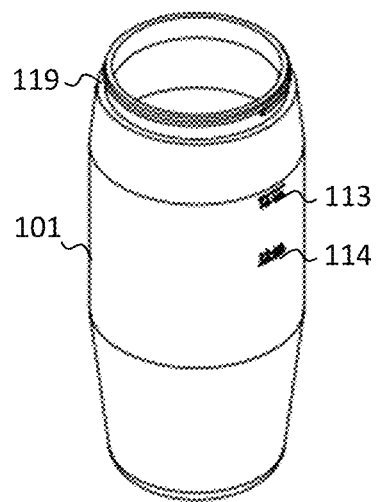
FIG. 2A shows a perspective view of container, according to an exemplary embodiment of the present subject disclosure.
Figure 2B:
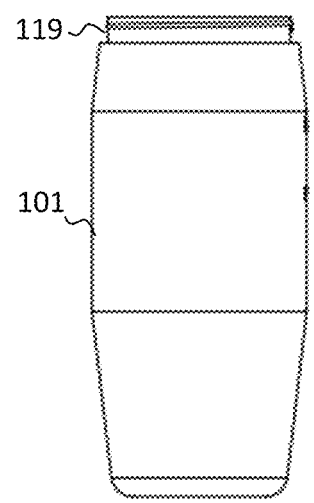
FIG. 2B shows a side view of container, according to an exemplary embodiment of the present subject disclosure.
Figure 2C:
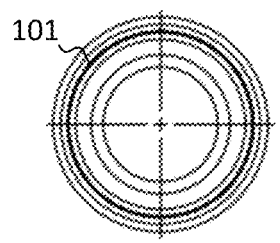
FIG. 2C shows a top view of container, according to an exemplary embodiment of the present subject disclosure.
Figure 3A:
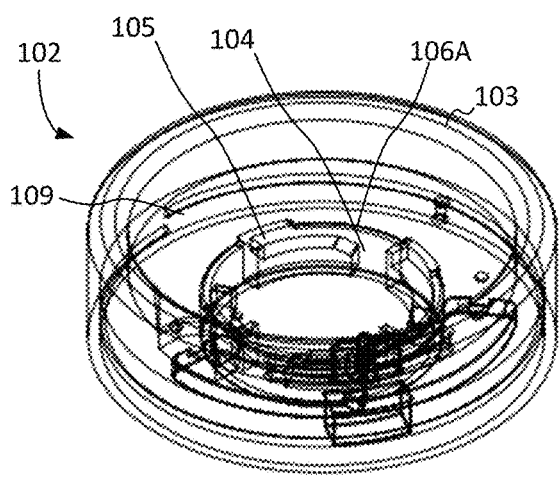
FIG. 3A shows a shadow perspective view of a lid, according to an exemplary embodiment of the present subject disclosure.
Figure 3B:
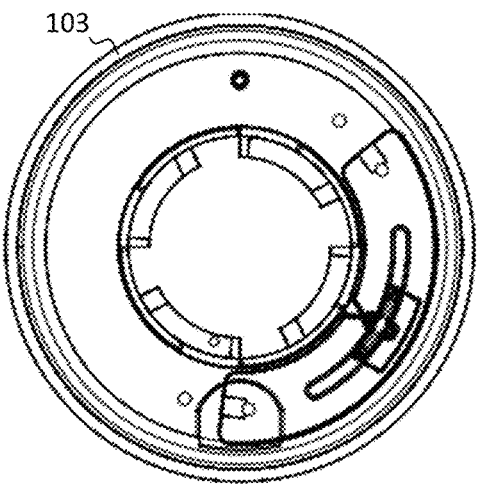
FIG. 3B shows a shadow top view of a lid, according to an exemplary embodiment of the present subject disclosure.
Figure 3C:
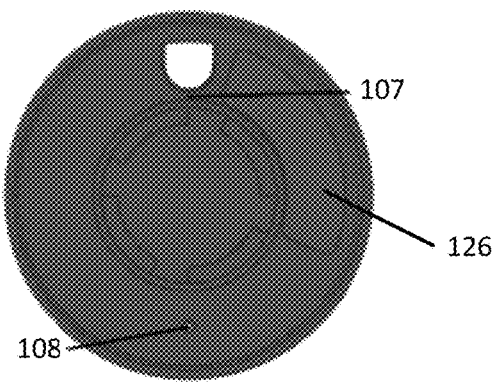
FIG. 3C shows a bottom view of a lid, according to an exemplary embodiment of the present subject disclosure.
Figure 3D:
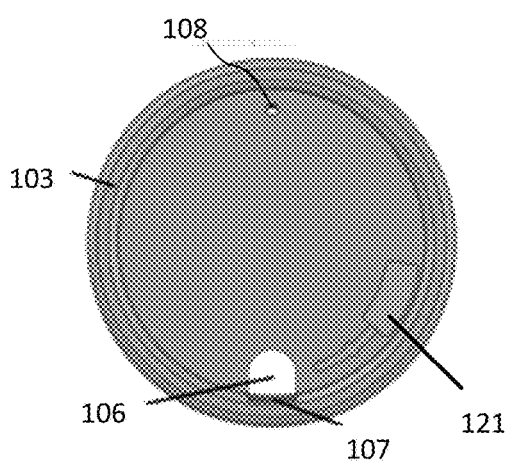
FIG. 3D shows a top view of a lid, according to an exemplary embodiment of the present subject disclosure.

FIGS. 2A-2C show the container/mug portion 101 from a side perspective (FIG. 2A), a side (FIG. 2B), and a top view (FIG. 2C). One or markers 113, 114 may indicate the fill level of the mug before insertion of the internal basket 130. The mug threads 119 engage the mug lid threads 109 (shown in FIG. 3A).

FIGS. 3A, 3B, 3C, and 3D show a mug lid 102 in a shadow perspective view, shadow top view, bottom view, and top view, respectively. The lid 102 includes a thick, tall lip 103 for a "substantial feel" and to allow clearance of the user's nose while sipping.

The lid's vertical channels 104 engage and align the spacer tabs 142 during assembly (See FIG. 7) in order to connect the basket assembly 130 to the lid 102. When engaged and twisted clockwise, the spacer tabs 142 slide through the lid horizontal channels 105 until they hit a stop. The lid opening 106 allows both sipping and use of a straw. It cuts slightly into the bottom edge of the lip 103 to create a low point for coffee to flow to during use. It is sufficiently tall to allow a straw to sit at an angle and reach the bottom of the mug 101 when inserted and has sloped walls to further allow for a straw's deflected angle of insertion.

There is clearance 107 between the lid opening 106 and the slotted portion of the lid below to allow for movement of or stirring with a straw when used (and assemblies removed). See FIGS. 1C, 3C, and 3D. The lid vent 108 allows air to enter the container 101 as coffee exits. The lid vent 108 is helpful if the user's lips make an air-tight seal against the contours of the mug lid 102. The lid vent 108 also functions to equalize internal/external air pressure.

The mug threads 119 on the container 101 engage the mug lid threads 109 on the lid 102. The mug lid 102 threads onto the mug 101 to prevent misalignment or banging of the internal assembly 130 when it is attached to the mug lid 102 while the lid 102 is either being screwed into or unscrewed from the mug 101.

Figure 4A:
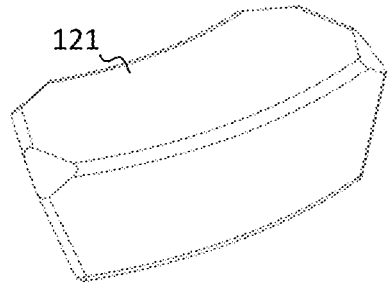
FIG. 4A shows an upper perspective view of an upper side of a lid closing mechanism, according to an exemplary embodiment of the present subject disclosure.
Figure 4D:
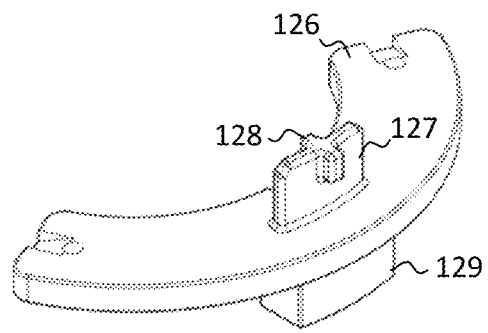
FIG. 4D shows an upper perspective view of a lower side of a lid closing mechanism, according to an exemplary embodiment of the present subject disclosure.
Figure 4B:
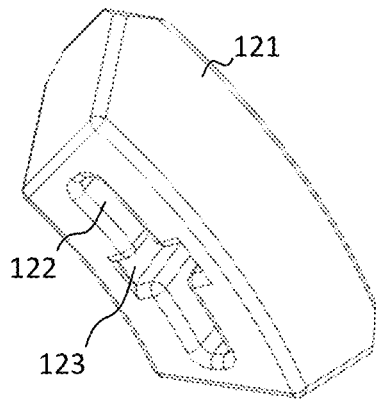
FIG. 4B shows a lower perspective view of an upper side of a lid closing mechanism, according to an exemplary embodiment of the present subject disclosure.
Figure 4E:
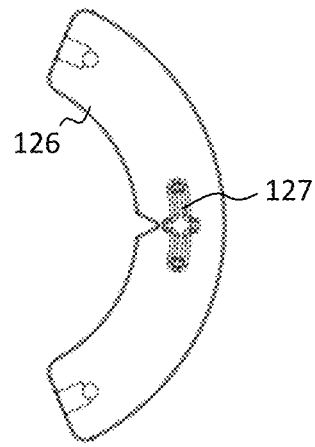
FIG. 4E shows a top view of a lower side of a lid closing mechanism, according to an exemplary embodiment of the present subject disclosure.
Figure 4C:
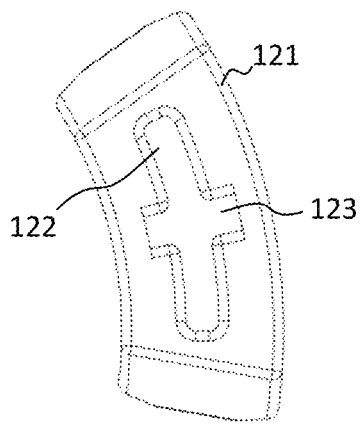
FIG. 4C shows a bottom view of an upper side of a lid closing mechanism, according to an exemplary embodiment of the present subject disclosure.
Figure 4F:
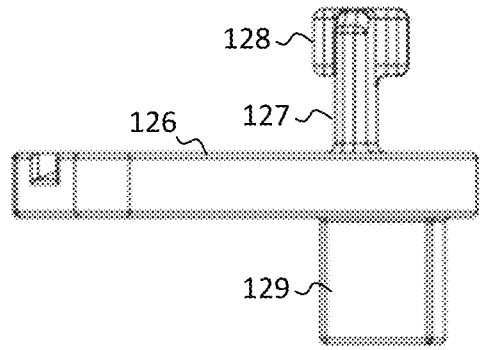
FIG. 4F shows a side view of a lower side of a lid closing mechanism, according to an exemplary embodiment of the present subject disclosure.

FIGS. 4A-4F show the upper slide portion 121 and lower slide portion 126 of the closing mechanism within the lid 102. More specifically, FIGS. 4A-4C show a top side perspective, bottom side perspective, and bottom view, respectively, of the upper slide portion 121. Further, FIGS. 4D-4F show a top side perspective, top view, and side view, respectively, of the lower slide portion 126. The upper slide portion 121 is to be operated by a user's finger as the user opens/closes the mug opening 106. The upper side portion 121 has a slide cut-out 122 which allows for insertion of the lower closing mechanism tab 127. Keyway 123 engage and snap onto the nub 128 on the lower closing mechanism tab 126. The lower slide portion 126 slides over the mug opening 106 when operated by the user via the upper slide portion 121. Further, tab 129 is used to assist in holding lower closing mechanism tab 126 during assembly. Other sliding mechanisms are possible and within the scope of the present disclosure.

Figure 5A:
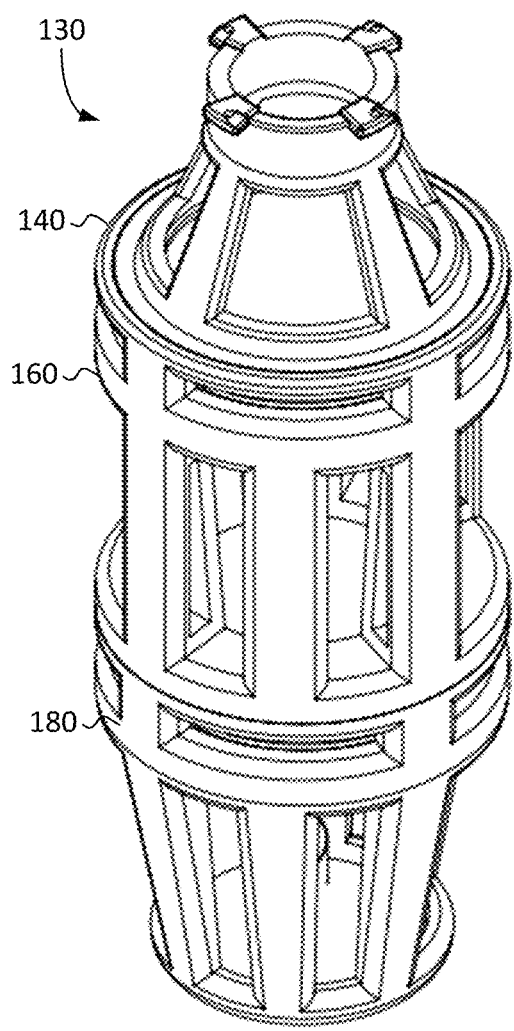
FIG. 5A shows a perspective view of a basket assembly, according to an exemplary embodiment of the present subject disclosure.
Figure 5B:
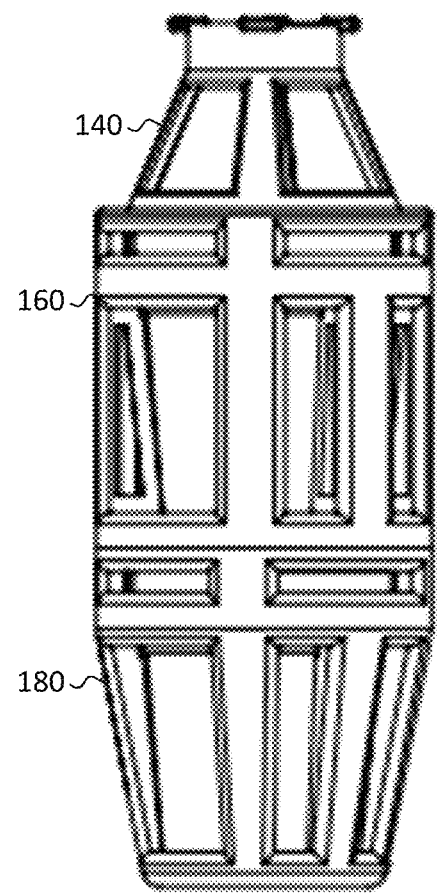
FIG. 5B shows a side view of a basket assembly, according to an exemplary embodiment of the present subject disclosure.
Figure 5C:
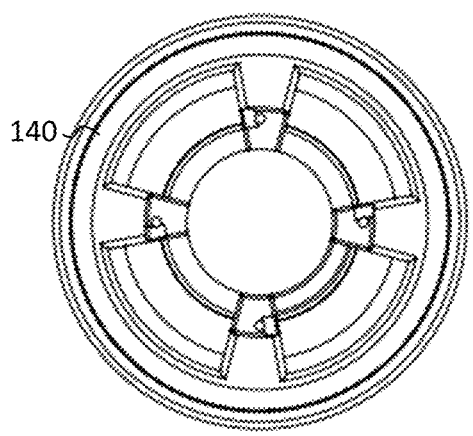
FIG. 5C shows a top view of a basket assembly, according to an exemplary embodiment of the present subject disclosure.

FIGS. 5A, 5B, and 5C, show a side perspective, side, and top view, respectively, of the basket assembly 130. The basket assembly comprises of several modular and separable components, including a top spacer 140, an upper/top holder 160, and a lower/bottom holder 180. Each of the spacers 140, and holders 160, 180 have a plurality of windows, including larger and smaller windows. The smaller windows (e.g., 152, 172) are covered with filters (not shown) to allow water to penetrate the interior of the basket 130 and interact with the coffee grinds or tea leaves housed therein. The larger windows (e.g., 164, 166) act as cut outs to reduce the volume of material within the device.

Figure 6A:
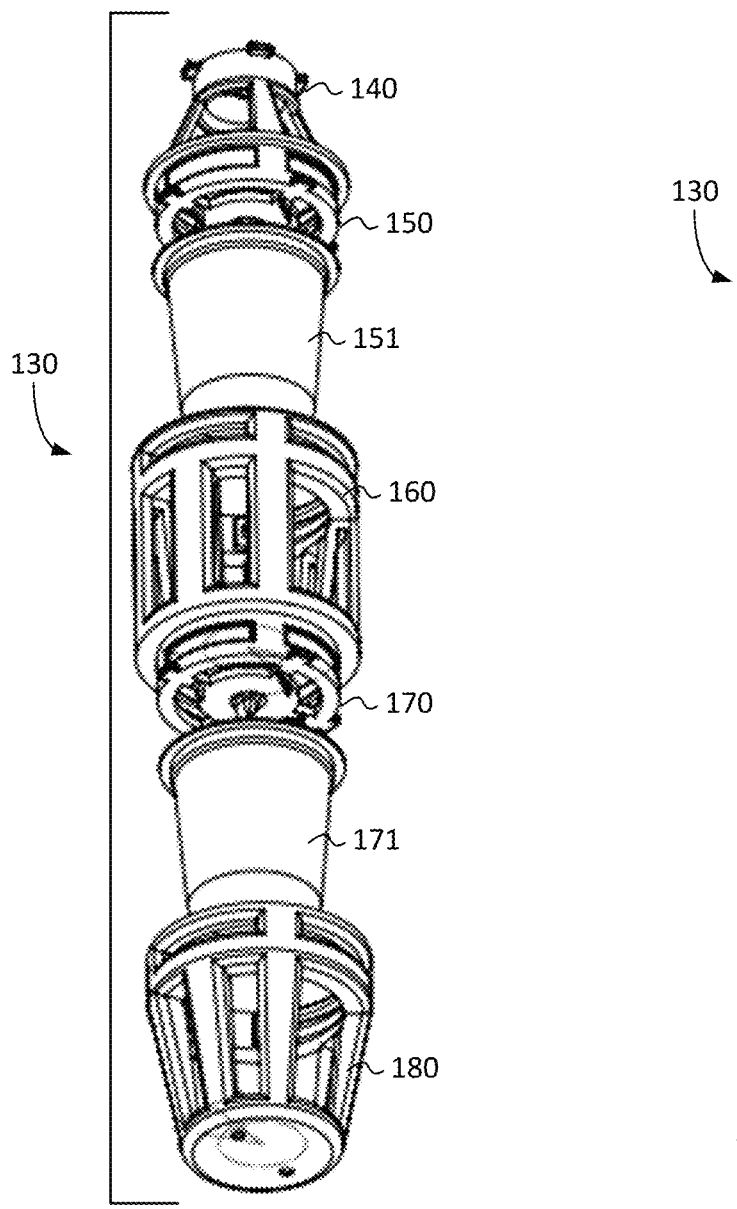
FIG. 6A shows an exploded perspective view of a basket assembly, according to an exemplary embodiment of the present subject disclosure.
Figure 6B:
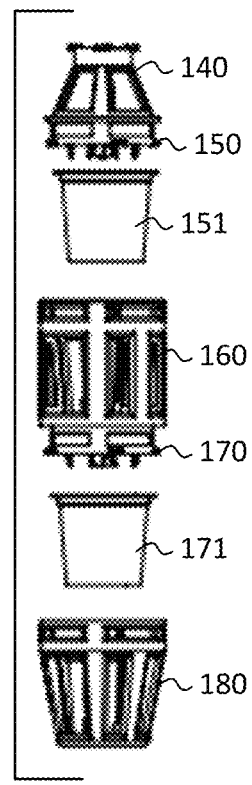
FIG. 6B shows an exploded view of a basket assembly, according to an exemplary embodiment of the present subject disclosure.
Figure 6C:
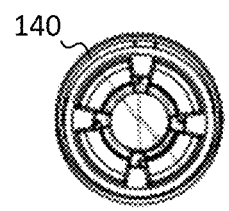
FIG. 6C shows a top view of a basket assembly, according to an exemplary embodiment of the present subject disclosure.

FIGS. 6A, 6B, and 6C show an exploded bottom perspective, an exploded side, and a top view, respectively, of the basket assembly 130. The spacer 140 has a top slicer 150 connected to its underside. The top slicer 150 engages with a top portion of a first disposable coffee cup 151, which is housed within the top holder 160. A bottom slicer 170 is connected to the underside of the top holder 160, which engages with a top portion of a disposable coffee cup 171, which is housed within the bottom holder 180. This set up allows a user to have one or two coffee cups 151, 171, having the same or different flavors. Each component is modular and may be replaced or exchanged as needed, and will be described in detail individually.

Figure 7A:
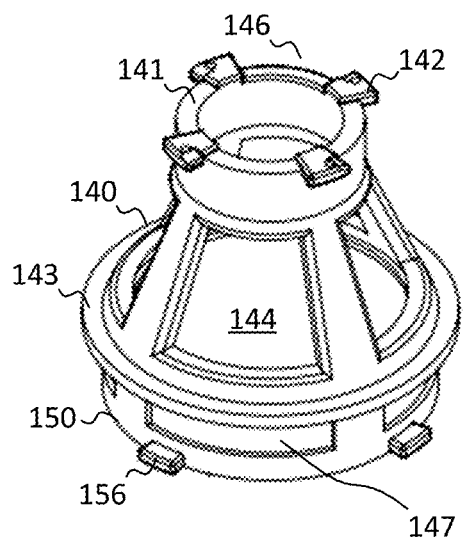
FIG. 7A shows a perspective view of a spacer and upper slicer, according to an exemplary embodiment of the present subject disclosure.
Figure 7B:
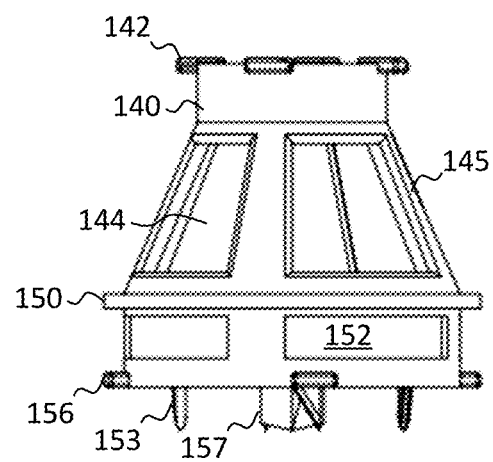
FIG. 7B shows a side view of a spacer and upper slicer, according to an exemplary embodiment of the present subject disclosure.
Figure 7C:
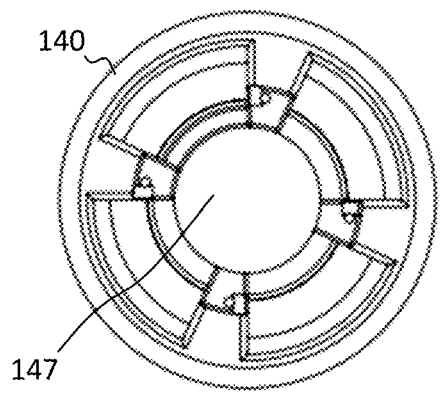
FIG. 7C shows a top view of a spacer and upper slicer, according to an exemplary embodiment of the present subject disclosure.

FIGS. 7A, 7B, and 7C show a side perspective, side and top view of the spacer 140 and upper slicer 150. The upper slicer 150 is shown attached to the internal spacer 140. A function of the spacer 140 is to displace the internal assembly 130 vertically downward to keep the water level above the top level of the upper coffee cup 151, and allow water level fluctuation during initial submersion, when the single serve coffee cups 151, 171 are filled with air. The spacer 140 allows water to reach a maximum level 111 (due to air-filled single serve coffee cups 151, 171) as well as a minimum level 112 (due to water-filled single serve coffee cups 151, 171) that is above the upper holder windows 164 during brewing, subject to the user properly filling the mug to the twelve fluid ounce fill line 114.

During brewing, water will move through the spacer windows 144 and the slicer windows 152. The spacer tabs 142 engage the mug lid's vertical channels 104 of the mug lid 102 during assembly, and act as a locking mechanism after they are rotated clockwise through the lid's horizontal channels 105 and hit a stop. The spacer 140 has a round top portion 141 and a round bottom portion 143, which are connected through a tapered intermediate portion 145. The tapered portion 145 and the smaller round top 141 allow for coffee to flow through the lid opening 106 if the user chooses to leave the internal assembly 130 inside the mug 101 while drinking.

The single serve coffee cup foil slice windows 152 sit horizontally over the slicers 153 in the foil after assembly and allow water to flow downward into the single serve coffee cups 151. The spacer collar 143 engages the circular alignment feature 168 in the upper holder 160 and allows for a more rigid feel during assembly, especially if assembled without a single serve coffee cup 151, which creates compressed rigidity when present. The filtration mesh collar (not shown in this figure, but which accommodates screen 334 in FIG. 16) allows for the manual installation of a circular disk 147 of stainless-steel mesh, positioned horizontally over the foil slice window (not shown but similar to 174 in FIG. 9C) and slicers 153 in the single serve coffee cup 151 after assembly. The circular disk mesh 147 prevents buoyant, loose coffee grounds from escaping during brewing. The spacer air slots 146 allow for trapped air in the upper spacer to escape and exit through the lid air slots 106A, and eventually the lid vent 108 and the lid opening 106. Along with the slicers 153 is an optional center punch mechanism 157. The center punch 157 works along with the knives/slicers 153 to get the grounds fully soaked and allow trapped air to escape.

FIGS. 8A, 8B, and 8C show a side perspective view, side view, and upper view, respectively, of the upper holder 160 with lower slicer 170 attached thereto. The upper holder 160 has many of the same structural features as the lower holder 180. The vertical channels 161 of the upper holder 160 provide stability as the user pushes (using the spacer 140) the single serve coffee cups 151 down onto the stainless steel hollow needles 165 embedded in the holder exit holes. The vertical channels 161 engage the slicer tabs 156 during assembly. When the slicer tabs 156 reach the bottom of the vertical channels 161, they are rotated clockwise through horizontal channels 163 until they hit a stop. The holder 160 outer windows 162 allow water to enter.

After assembly, the holder outer windows 162 align with the slicer inner windows 152 and have the same vertical and angular dimensions. Cut-outs 164 in the upper holder minimize the overall volume of the assembly and the material requirements during manufacturing. The single serve coffee cup 151 access window 166 allows the user to grasp the single serve coffee cup 151 with fingers on both sides in order to remove it after brewing is complete. The shelf 177 provides support to the single serve coffee cup 151 as it is compressed and sliced open by the slicer knives 153. The clearance cutout 167 allows space for a protruding collar that often occurs below the rim of the single serve coffee cup 151, making for easier assembly.

Figure 9A:
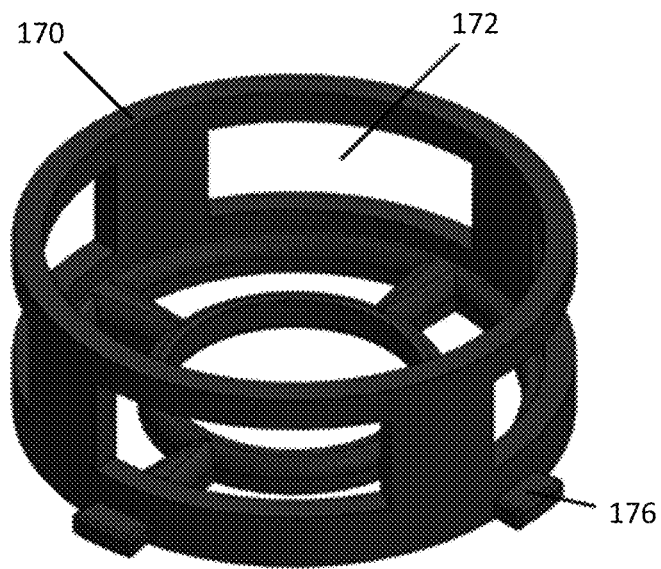
FIG. 9A shows a perspective view of an upper or lower slicer, according to an exemplary embodiment of the present subject disclosure.
Figure 9B:
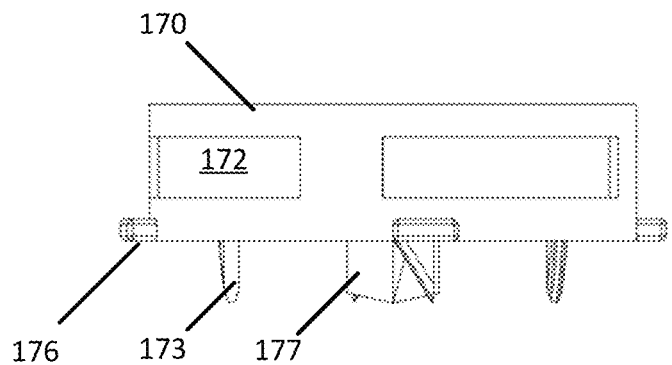
FIG. 9B shows a side view of an upper or lower slicer, according to an exemplary embodiment of the present subject disclosure.
Figure 9C:
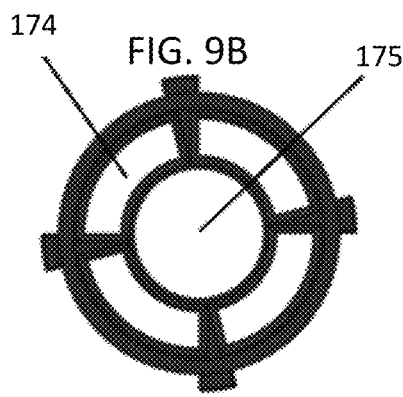
FIG. 9C shows a top view of an upper or lower slicer, according to an exemplary embodiment of the present subject disclosure.

FIGS. 9A, 9B, and 9C show a side perspective, side view, and top view, respectively, of the lower slicer 170. The slicer filtration windows 172 align (after assembly) with the holder filtration windows 182 and have the same vertical and angular dimensions. The slicer tabs 176 function in alignment when engaged with the vertical channels 181 and as an assembly locking mechanism in the horizontal channels 183 after assembly. The single serve coffee cup foil slice windows 174 sit horizontally over the slices made in the foil by 173 after assembly and allow water to flow into the single serve coffee cups 171. In some embodiments, a slicer removal hole 175 is used instead of the center punch 177, with the hole 175 having a larger radius than the holder removal hole 186 and allows the user to poke a finger to a greater depth than the holder removal hole 186 when removing the single serve coffee cups 171 after brewing. The slicer knives 173 are positioned radially to cut through the center of the single serve coffee cup foil slice windows 174 and are manually plunged through the single serve coffee cup foil during assembly. They create angular cuts when the user twists the slicer during assembly, as will be described in detail in FIG. 11. Along with the slicer knives 173 is an optional center punch mechanism 177. The center punch 177 works along with the knives 173 to get the grounds fully soaked and allow trapped air to escape.

Figure 10A:
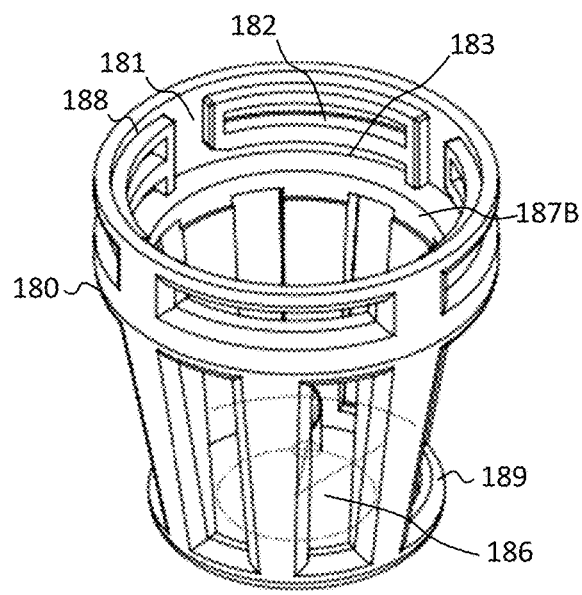
FIG. 10A shows a perspective view of a lower holder, according to an exemplary embodiment of the present subject disclosure.
Figure 10B:
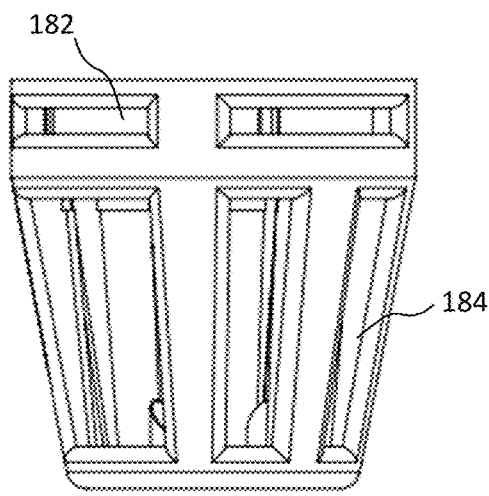
FIG. 10B shows a side view of a lower holder, according to an exemplary embodiment of the present subject disclosure.
Figure 10C:
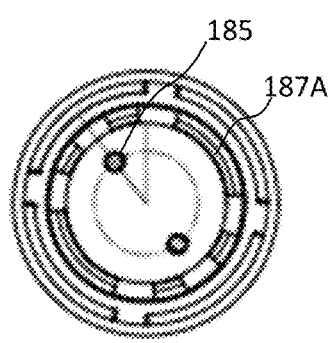
FIG. 10C shows a top view of a lower holder, according to an exemplary embodiment of the present subject disclosure.

FIGS. 10A, 10B, and 10C show a side perspective view, side view, and upper view, respectively, of the lower holder 180. The vertical channels 181 of the upper and lower holders provide stability as the user pushes the single serve coffee cup 171 down onto the stainless steel hollow needles embedded in the holder exit holes 185. The vertical channels 181 engage the slicer tabs 176 of the lower slicer 170 during assembly. When the slicer tabs 176 reach the bottom of the vertical channels 181, they are rotated clockwise through horizontal channels 183 until they hit a stop. The holder outer windows 182 allow water to enter/exit. After assembly, the holder outer windows 182 align with the slicer inner windows 172 and have the same vertical and angular dimensions. Cut-outs 184 in the holder 180 minimize the overall volume of the assembly and the material requirements during manufacturing. The single serve coffee cup 171 access window 189 allows the user to grasp the single serve coffee cup 171 with fingers on both sides in order to remove it after brewing is complete. The shelf 187A provides support to the single serve coffee cup 171 as it is compressed and sliced open by the slicer knives 173. The clearance cutout 187B allows space for a protruding collar that often occurs below the rim of the single serve coffee cup 171, making for easier assembly.

The slicer windows 172 align (after assembly) with the lower holder outer windows 182 and have the same vertical and angular dimensions. The slicer tabs 176 function as alignment features when engaged with both the circular alignment feature 188 and the vertical channels 181 of the lower holder. They act as locking mechanisms in the lower holder's 180 horizontal channels 183 after assembly. The slicer knives 173 are positioned radially to cut through the center of the single serve coffee cup and are manually plunged through the single serve coffee cup foil during assembly. The slicer knives 173 create angular cuts when the user twists the slicer 170 clockwise during assembly. The lower holder has angular cut-outs 184 to minimize displacement volume during brewing and material during manufacturing.

Figure 11A:
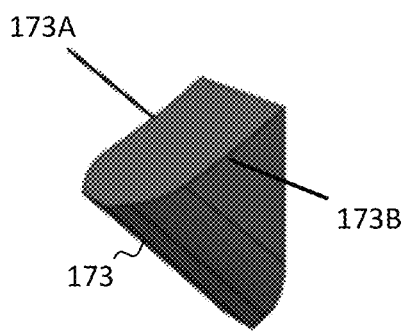
FIG. 11A shows a perspective view of a cutting tool, according to an exemplary embodiment of the present subject disclosure.
Figure 11B:
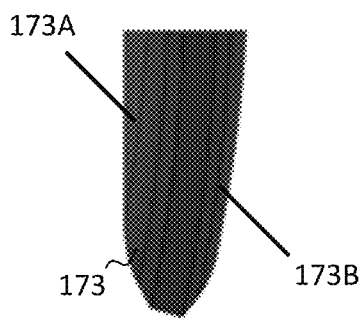
FIG. 11B shows a side view of a cutting tool, according to an exemplary embodiment of the present subject disclosure.
Figure 11C:
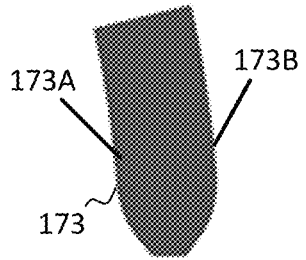
FIG. 11C shows a top view of a cutting tool, according to an exemplary embodiment of the present subject disclosure.

FIGS. 11A, 11B, and 11C show side perspective view, side view, and top view, respectively, of slicer knives 173. The knives 173 are shown to have an inner side 173A and outer side 173B wherein the inner side 173A has a smaller radius than the outer side 173B to minimize friction and binding forces during rotational cutting.

FIGS. 12-23 disclose additional exemplary embodiments which have different features and configurations as those shown and described in FIGS. 1-11. For sake of brevity, each of the embodiments of FIGS. 12-23 will not be described in detail, but only the features which are different will be shown and described in the figures and associated discussion.

Figure 12A:
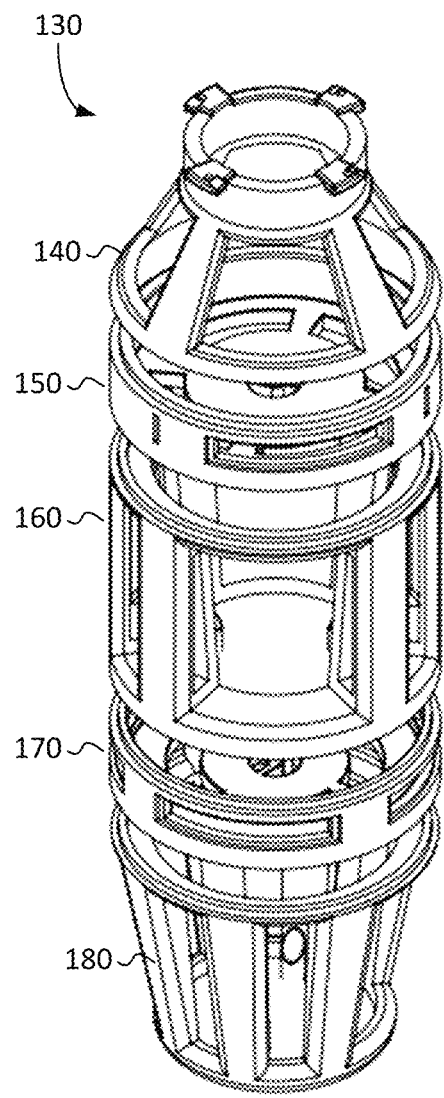
FIG. 12A shows an exploded perspective view of a basket assembly, according to an exemplary embodiment of the present subject disclosure.
Figure 12B:
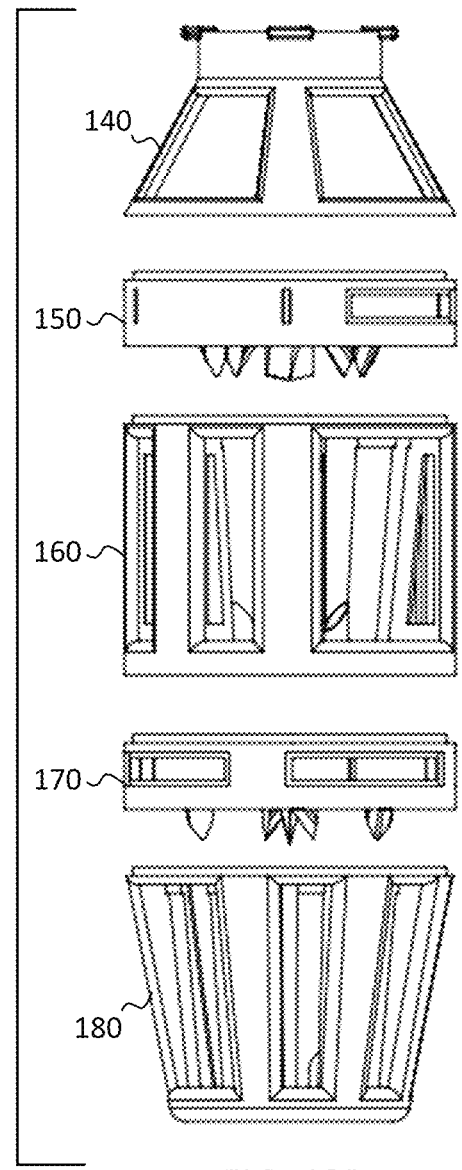
FIG. 12B shows an exploded view of a basket assembly, according to an exemplary embodiment of the present subject disclosure.
Figure 12C:
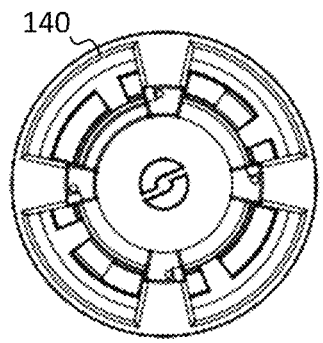
FIG. 12C shows a top view of a basket assembly, according to an exemplary embodiment of the present subject disclosure.

FIGS. 12A, 12B, and 12C show side perspective view, exploded side view, and top view of a closed basket 130. This embodiment allows for independent twisting of the slicers 150, 170 similar to a gas can collar instead of having the slicers fixed to the upper holders 140, 160, respectively.

Figure 13A:
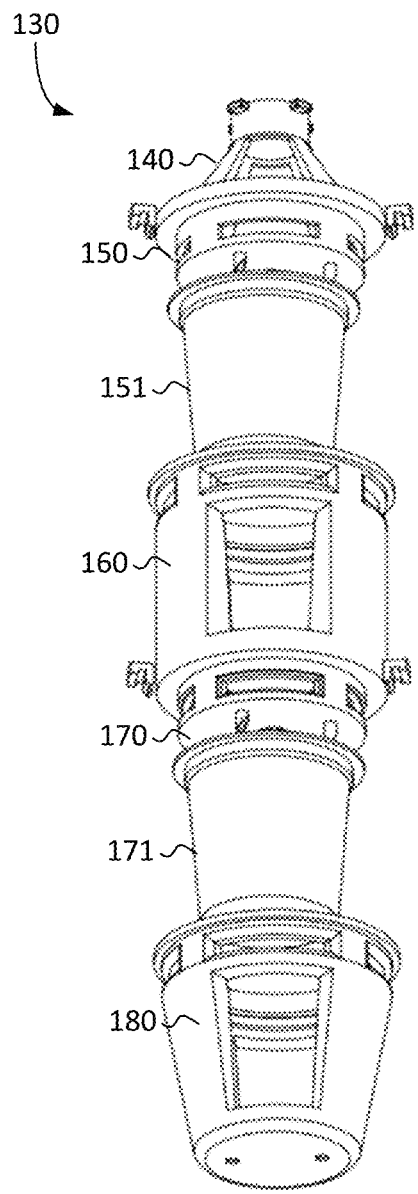
FIG. 13A shows a perspective view of a basket assembly, according to an exemplary embodiment of the present subject disclosure.
Figure 13B:
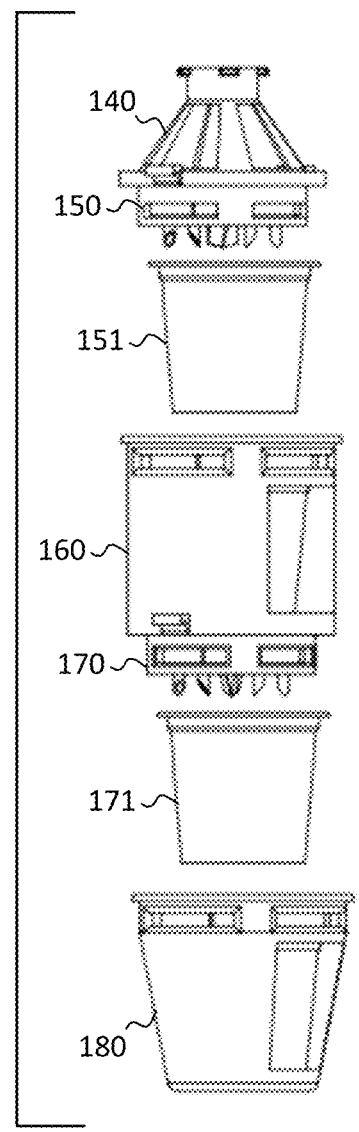
FIG. 13B shows an exploded view of a basket assembly, according to an exemplary embodiment of the present subject disclosure.
Figure 13C:
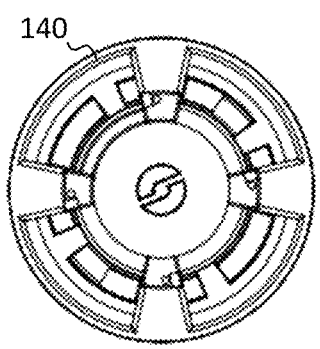
FIG. 13C shows a top view of a basket assembly, according to an exemplary embodiment of the present subject disclosure.

FIGS. 13A, 13B, and 13C show side perspective view, exploded side view, and top view of a closed basket 130. This embodiment presents a simple push down and latch design with hollow needles to allow coffee flow, with no twisting necessary.

Figure 14A:
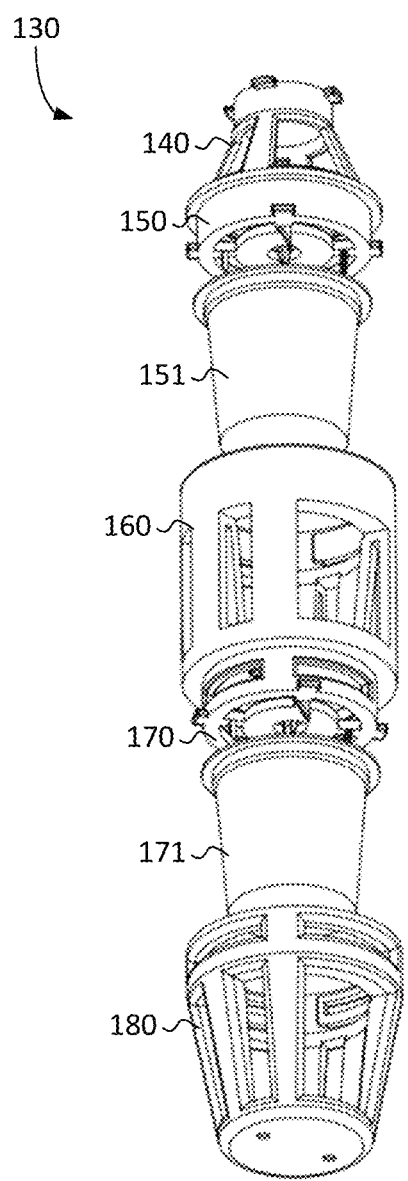
FIG. 14A shows a perspective view of a basket assembly, according to an exemplary embodiment of the present subject disclosure.
Figure 14B:
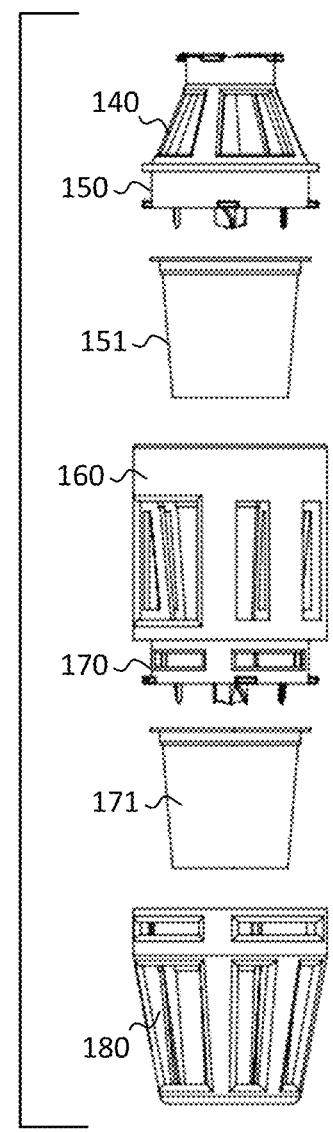
FIG. 14B shows an exploded view of a basket assembly, according to an exemplary embodiment of the present subject disclosure.
Figure 14C:
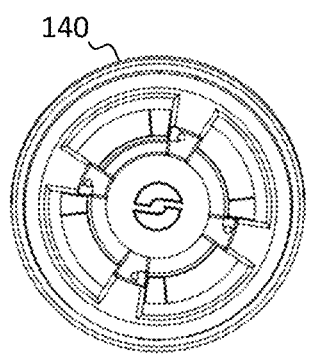
FIG. 14C shows a top view of a basket assembly, according to an exemplary embodiment of the present subject disclosure.

FIGS. 14A, 14B, and 14C show side perspective view, exploded side view, and top view of a closed basket 130. This embodiment is a simplified design with no top windows in the upper slicer 150, but still allows water to flow down through the upper spacer assembly 140.

Figure 15A:
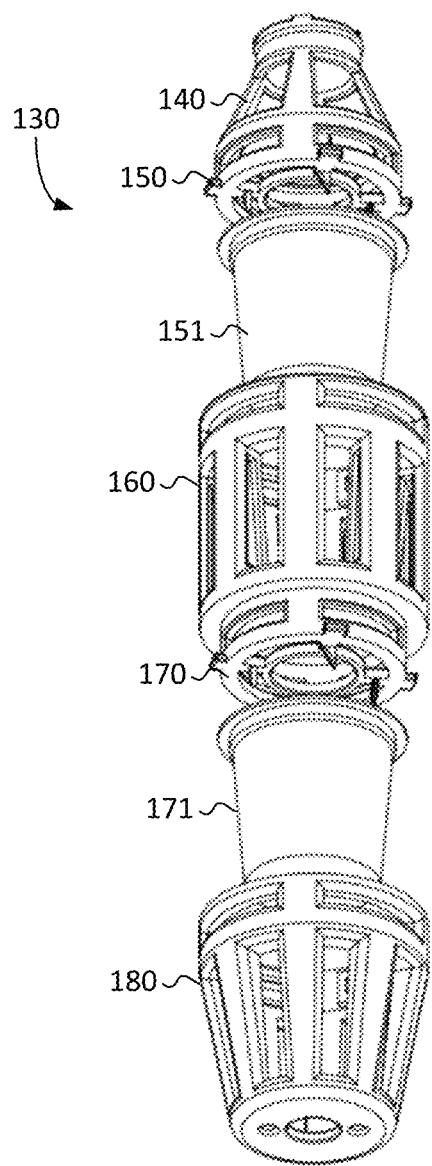
FIG. 15A shows a perspective view of a basket assembly, according to an exemplary embodiment of the present subject disclosure.
Figure 15B:
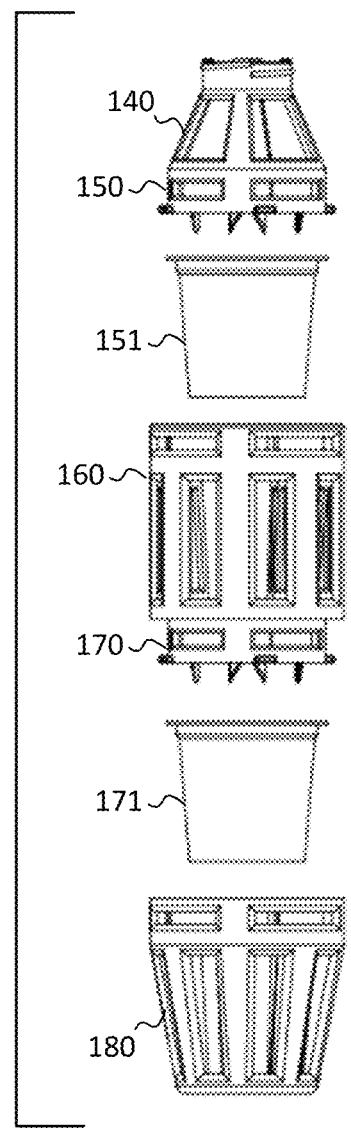
FIG. 15B shows an exploded view of a basket assembly, according to an exemplary embodiment of the present subject disclosure.
Figure 15C:
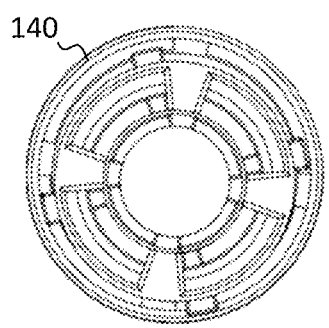
FIG. 15C shows a top view of a basket assembly, according to an exemplary embodiment of the present subject disclosure.

FIGS. 15A, 15B, and 15C show side perspective view, exploded side view, and top view of a closed basket 130. This embodiment presents an open center design to allow the straight downward flow of brewing coffee.

Figure 16A:
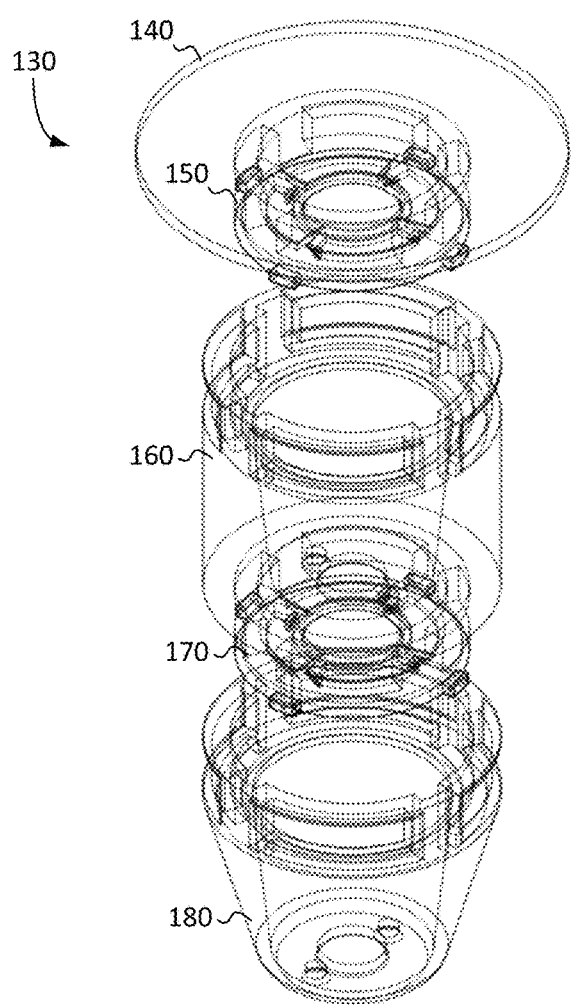
FIG. 16A shows a perspective view of a basket assembly, according to an exemplary embodiment of the present subject disclosure.
Figure 16B:
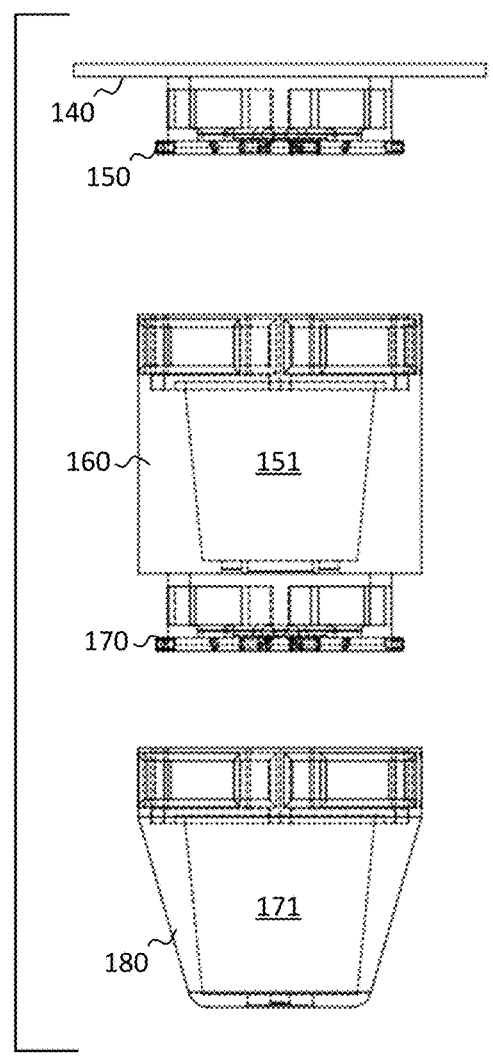
FIG. 16B shows an exploded view of a basket assembly, according to an exemplary embodiment of the present subject disclosure.
Figure 16C:
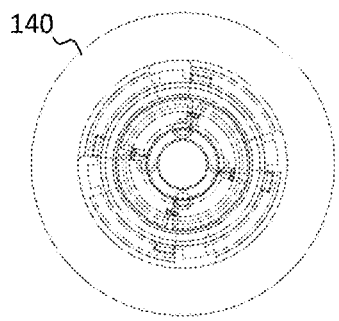
FIG. 16C shows a top view of a basket assembly, according to an exemplary embodiment of the present subject disclosure.

FIGS. 16A, 16B, and 16C show side perspective view, exploded side view, and top view of a closed basket 130. This embodiment includes knives which are recessed instead of protruding so they don't stick out of the slicers 150, 170.

Figure 17A:
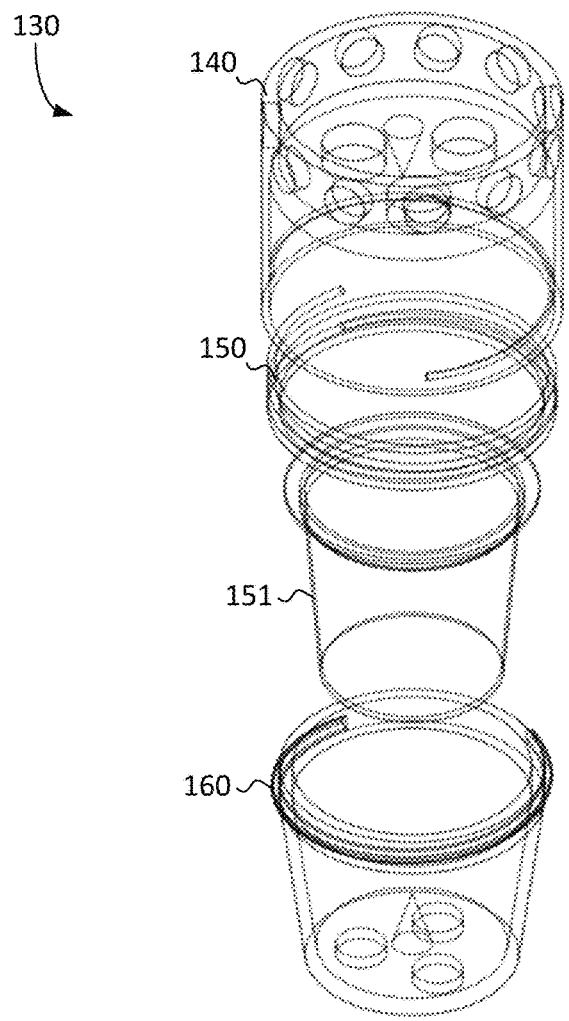
FIG. 17A shows a perspective view of a basket assembly, according to an exemplary embodiment of the present subject disclosure.
Figure 17B:
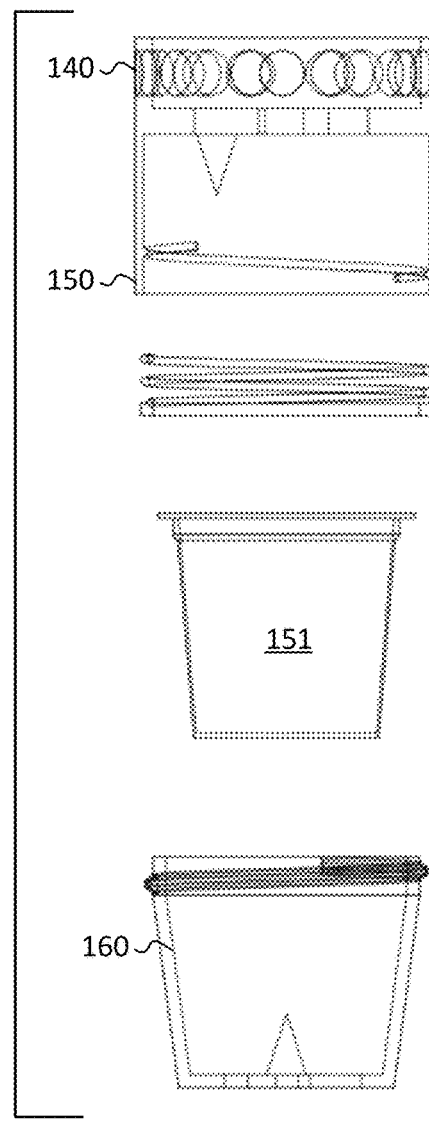
FIG. 17B shows an exploded view of a basket assembly, according to an exemplary embodiment of the present subject disclosure.
Figure 17C:
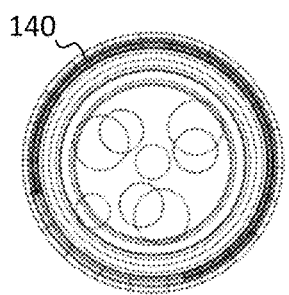
FIG. 17C shows a top view of a basket assembly, according to an exemplary embodiment of the present subject disclosure.

FIGS. 17A, 17B, and 17C show side perspective view, exploded side view, and top view of a closed basket 130. This embodiment includes a feature where the slicers 150 are screwed on instead of pushed down and twisted.

Figure 18A:
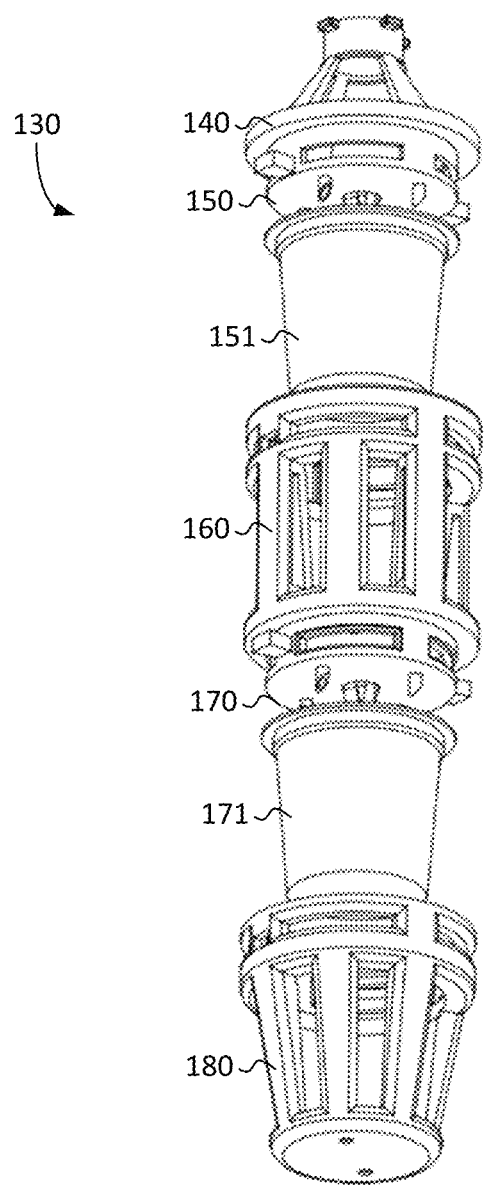
FIG. 18A shows a perspective view of a basket assembly, according to an exemplary embodiment of the present subject disclosure.
Figure 18B:
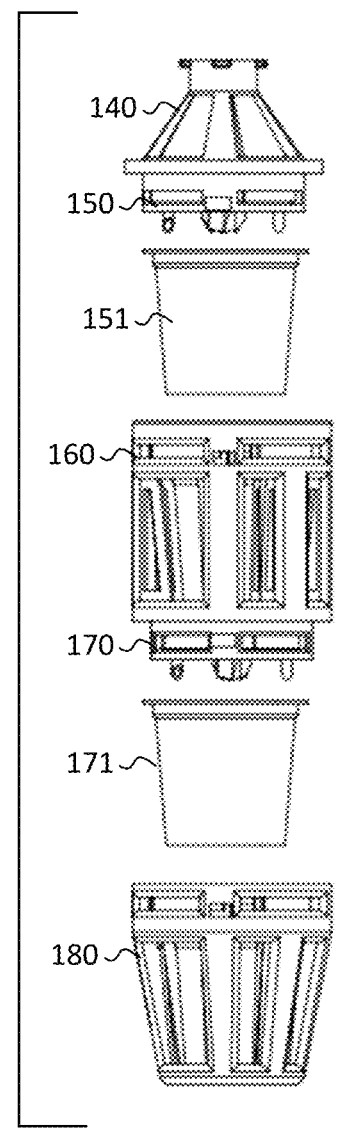
FIG. 18B shows an exploded view of a basket assembly, according to an exemplary embodiment of the present subject disclosure.
Figure 18C:
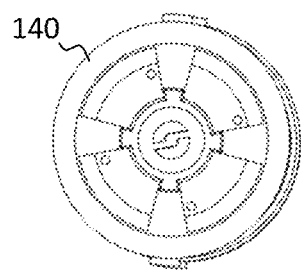
FIG. 18C shows a top view of a basket assembly, according to an exemplary embodiment of the present subject disclosure.

FIGS. 18A, 18B, and 18C show side perspective view, exploded side view, and top view of a closed basket 130. This embodiment includes a feature where the slicers 150, 170 are pushed down until a spring button engages in the holders 160, 180. The spring button allows release as well.

Figure 19A:
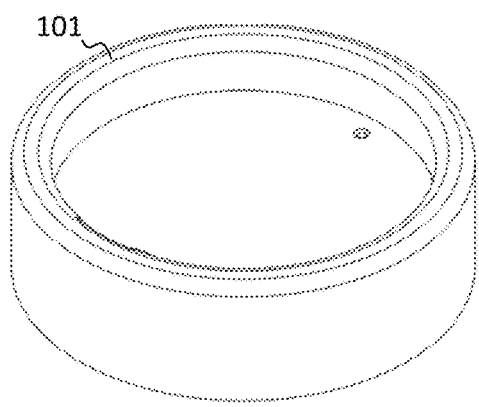
FIG. 19A shows a perspective top view of a lid, according to an exemplary embodiment of the present subject disclosure.
Figure 19B:
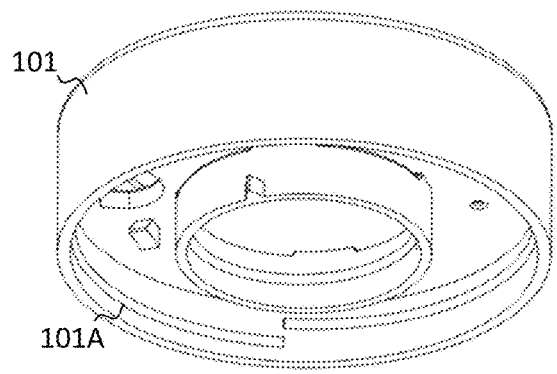
FIG. 19B shows a perspective bottom view of a lid, according to an exemplary embodiment of the present subject disclosure.
Figure 19C:
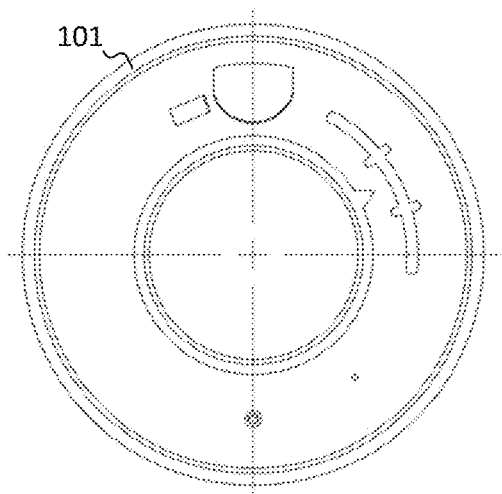
FIG. 19C shows a bottom view of a lid, according to an exemplary embodiment of the present subject disclosure.

FIGS. 19A, 19B, and 19C show top perspective view, side perspective view, and bottom view of a lid 101. This lid 101 with threads 101A allows the upper holder to be threaded onto the lid 101 instead of pushed up and twisted.

Figure 20A:
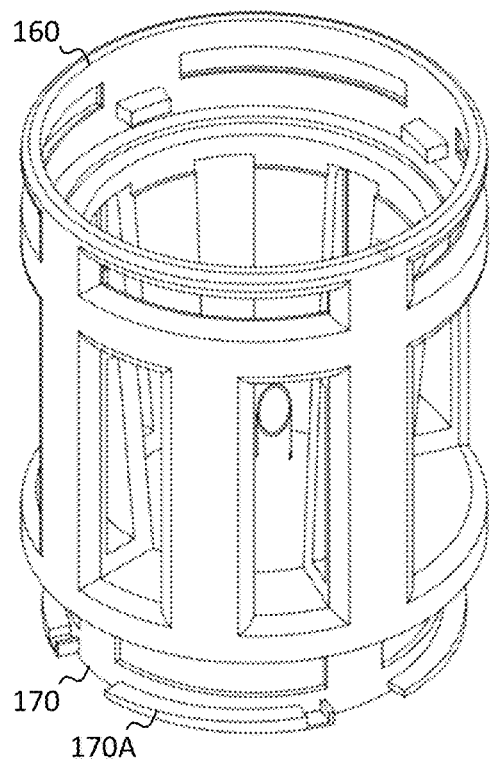
FIG. 20A shows a perspective top view of a holder/slicer, according to an exemplary embodiment of the present subject disclosure.
Figure 20B:
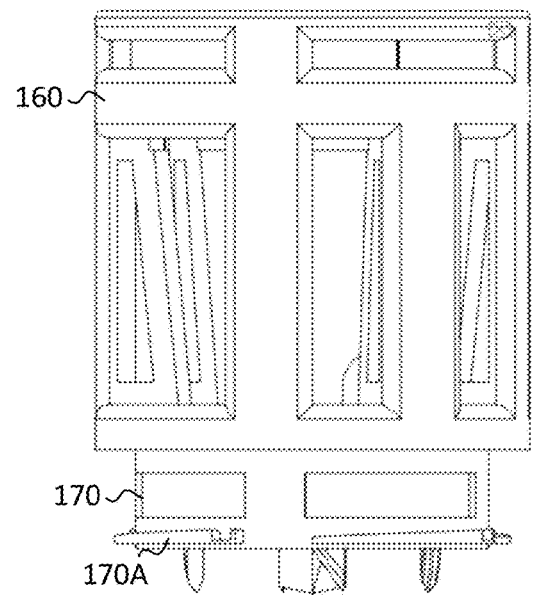
FIG. 20B shows a perspective bottom view of a holder/slicer, according to an exemplary embodiment of the present subject disclosure.
Figure 20C:
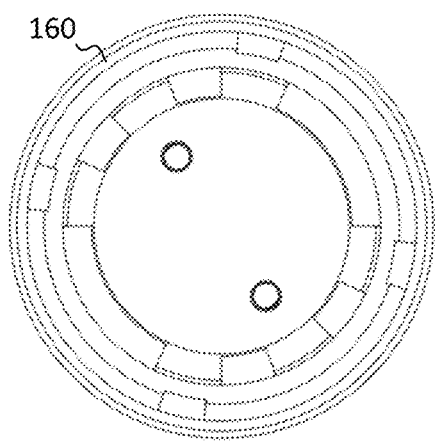
FIG. 20C shows a bottom view of a holder/slicer, according to an exemplary embodiment of the present subject disclosure.

FIGS. 20A, 20B, and 20C show side perspective view, side view, and top view of an upper holder 160. This embodiment is similar to prior described designs, except that the tabs ride along the ramp 170A in the slicers 170 until they reach the slot and engage.

Figure 21A:
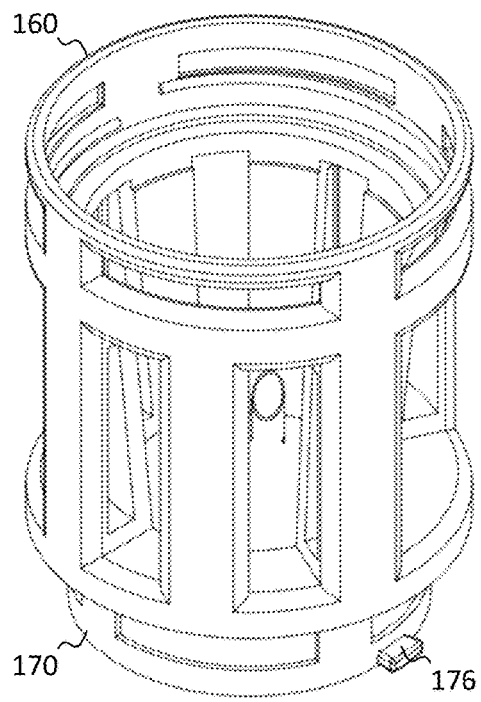
FIG. 21A shows a perspective top view of a holder/slicer, according to an exemplary embodiment of the present subject disclosure.
Figure 21B:
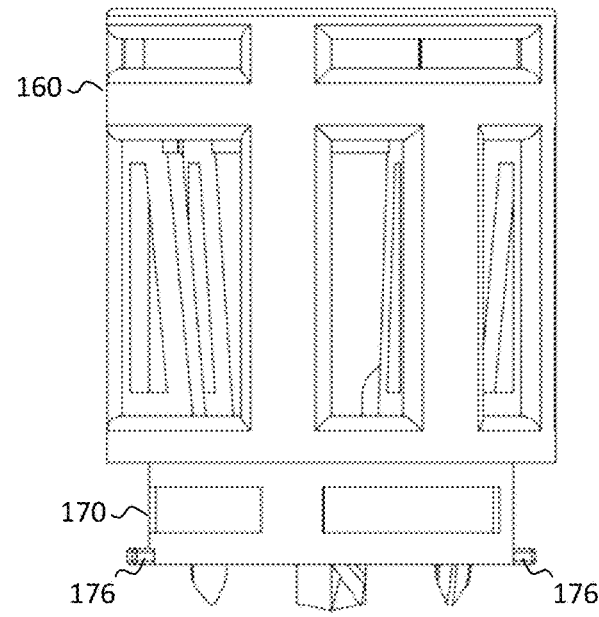
FIG. 21B shows a perspective bottom view of a holder/slicer, according to an exemplary embodiment of the present subject disclosure.
Figure 21C:
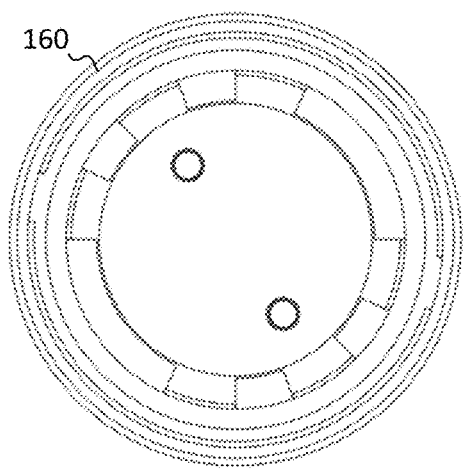
FIG. 21C shows a bottom view of a holder/slicer, according to an exemplary embodiment of the present subject disclosure.

FIGS. 21A, 21B, and 21C show side perspective view, side view, and top view of an upper holder 160. This embodiment is similar to prior described designs, except that it only has two tabs 176 on the slicer 170 that ride along threads in the holders.

Figure 22A:
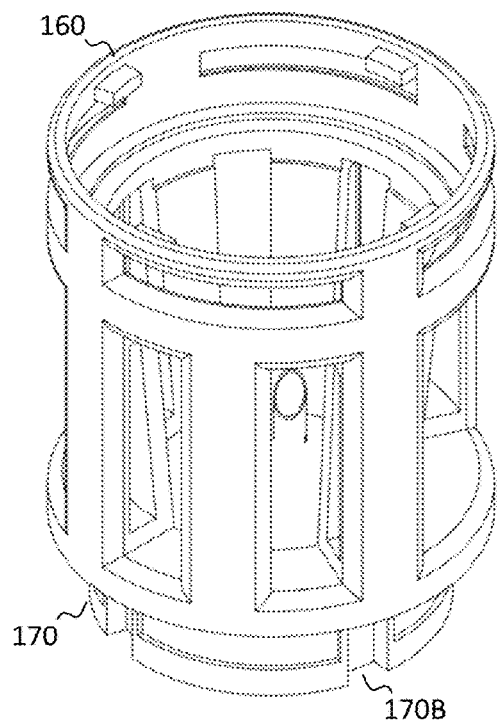
FIG. 22A shows a perspective top view of a holder/slicer, according to an exemplary embodiment of the present subject disclosure.
Figure 22B:
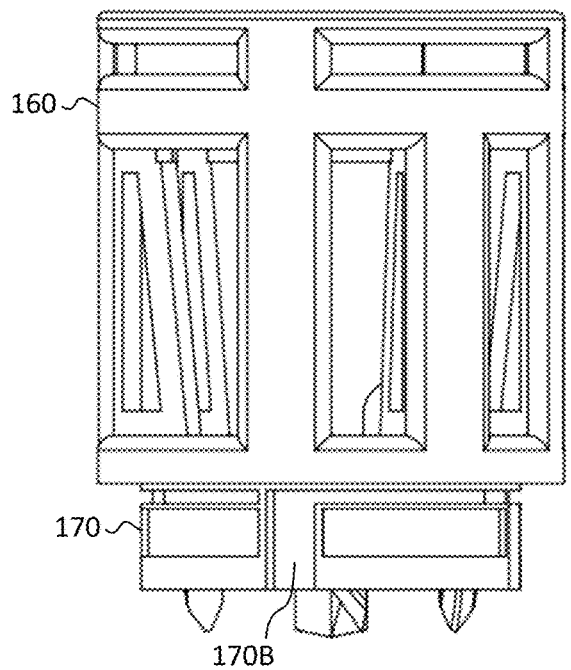
FIG. 22B shows a perspective bottom view of a holder/slicer, according to an exemplary embodiment of the present subject disclosure.
Figure 22C:
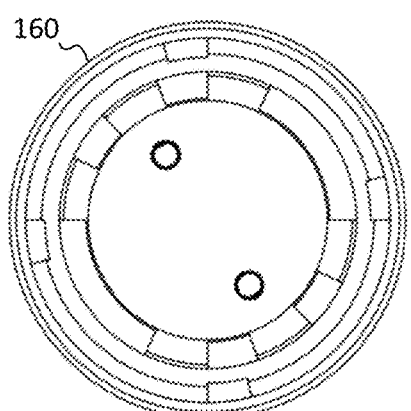
FIG. 22C shows a bottom view of a holder/slicer, according to an exemplary embodiment of the present subject disclosure.

FIGS. 22A, 22B, and 22C show side perspective view, side view, and top view of an upper holder 160. This embodiment is similar to prior described designs, except that the positions are reversed, with the tabs on the holders, and the slots 170B on the slicers 170.

Figure 23A:
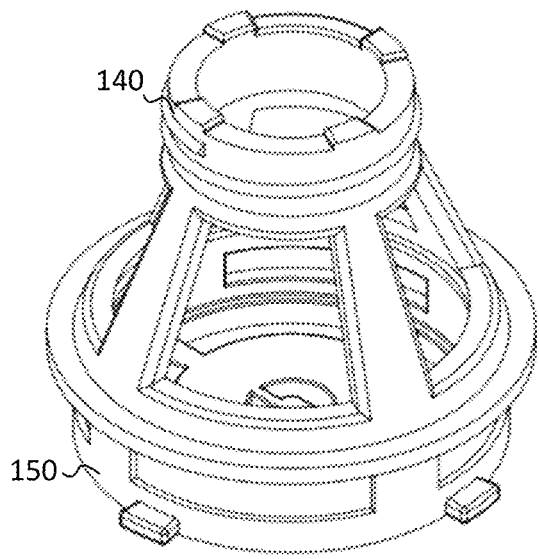
FIG. 23A shows a perspective top view of a spacer/slicer, according to an exemplary embodiment of the present subject disclosure.
Figure 23B:
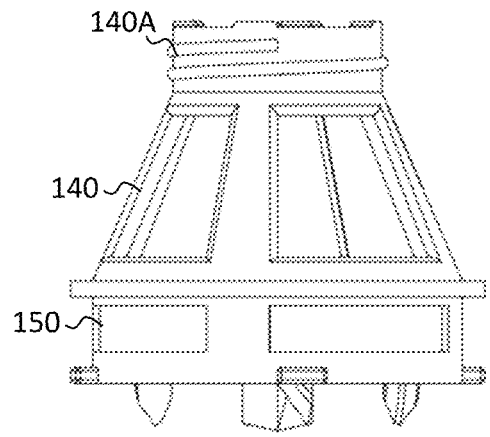
FIG. 23B shows a perspective bottom view of a spacer/slicer, according to an exemplary embodiment of the present subject disclosure.
Figure 23C:
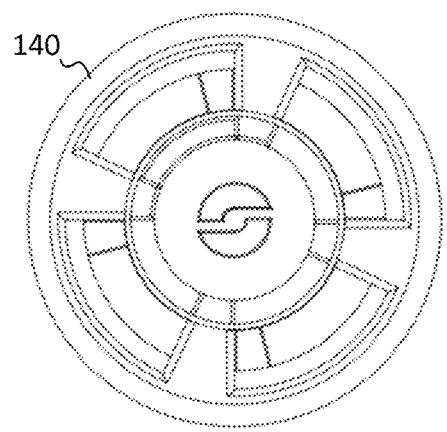
FIG. 23C shows a bottom view of a spacer/slicer, according to an exemplary embodiment of the present subject disclosure.

FIGS. 23A, 23B, and 23C show side perspective view, side view, and top view of top spacer 140. This embodiment is similar to prior described designs, except that to go along with the threaded lid, the spacer 140 is threaded and screws on to the threaded lid.

FIGS. 24-26 describe a brew device having an open basket assembly used to brew conventional coffees and teas in a holding container.

Figure 24A:
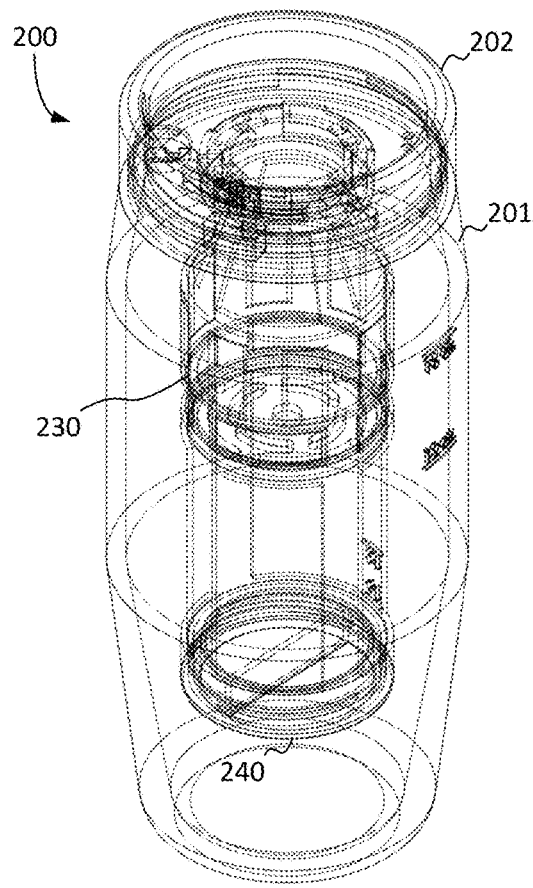
FIG. 24A shows a perspective view of an open basket device, according to an exemplary embodiment of the present subject disclosure.
Figure 24B:
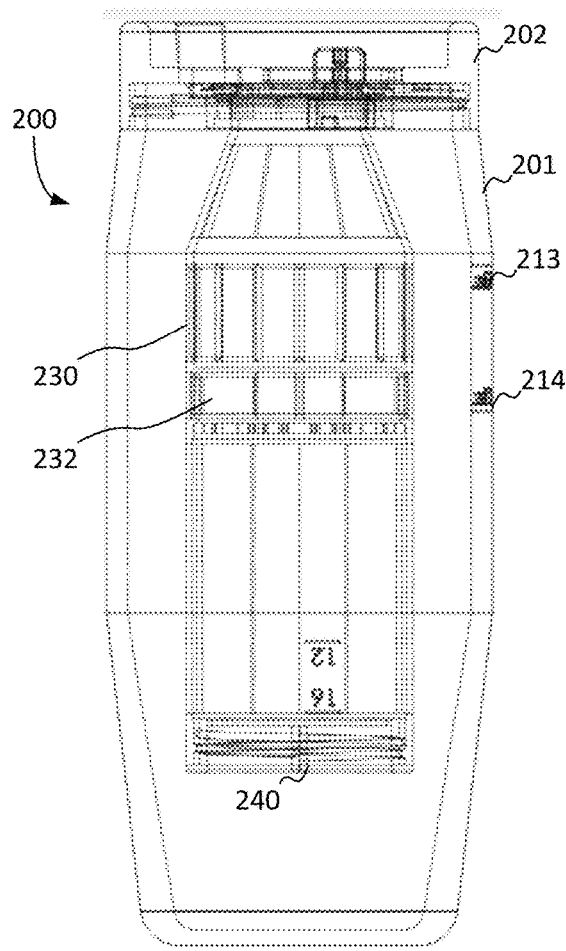
FIG. 24B shows a shadow side view of an open basket device, according to an exemplary embodiment of the present subject disclosure.
Figure 24C:
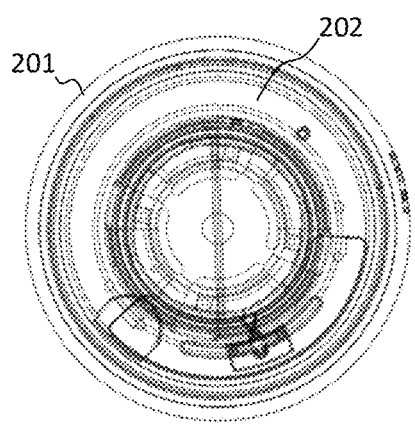
FIG. 24C shows a top view of an open basket device, according to an exemplary embodiment of the present subject disclosure.

FIGS. 24A, 24B, and 24C show side perspective, side, and top view of a brewing device 200 having an open filtered basket assembly 230. The device has a container 201 and a lid 202, similar to that described in FIG. 1. Further, and similarly to the device shown and described in FIG. 1, there exists a range of brewing volumes, from a minimum fill level of 214 to a maximum fill level of 213. These can correspond to, for example, 12 ounces to 16 ounces. The minimum brewing depth 214 indicates the water level after submersion for the twelve fluid ounce minimum brewing option where the basket windows 232 remain necessarily below the water level.

Figure 25A:
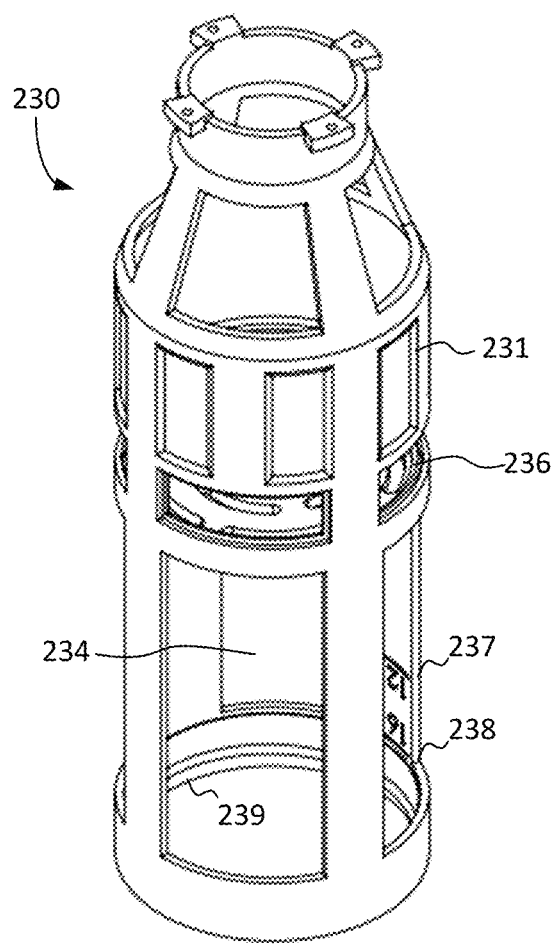
FIG. 25A shows a perspective view of an open basket, according to an exemplary embodiment of the present subject disclosure.
Figure 25B:
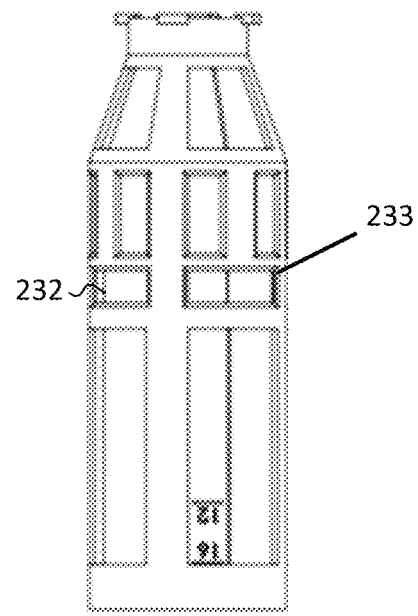
FIG. 25B shows a side view of an open basket, according to an exemplary embodiment of the present subject disclosure.
Figure 25C:
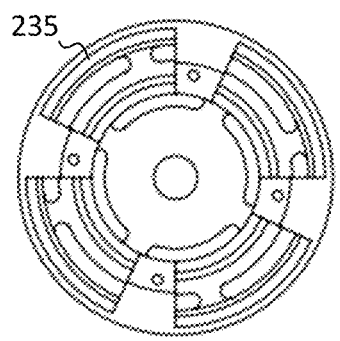
FIG. 25C shows a top view of an open basket, according to an exemplary embodiment of the present subject disclosure.

FIGS. 25A, 25B, and 25C show side perspective, side, and top view of an open filtered internal basket 230. It includes a grip portion 231 that both allows the user to handle and twist the basket as it is inserted into the mug lid 202. It displaces the basket downward so that its upper windows 232 are submerged when the user has chosen the twelve fluid ounce brewing option and the water level sits at the basket minimum brewing depth 233. An internal stainless-steel filtration screen (not shown) holds buoyant coffee grounds under water during brewing. The basket has large, open windows 234 that maximize water's access to the coffee grounds inside during brewing. An air escape disk 236 sits directly above the deposit of coffee grounds, allowing air to escape. Any coffee grounds that escape through the disk 236 are trapped behind the windows 232 and the screened surface directly above. The basket threads 239 engage the basket lid threads 246 during assembly. When the basket 230 is inverted, the twelve and sixteen fluid ounce coffee ground fill lines 237 and 238, respectively, indicate to the user where to fill with coffee grounds for those respective brewing options.

Figure 25D:
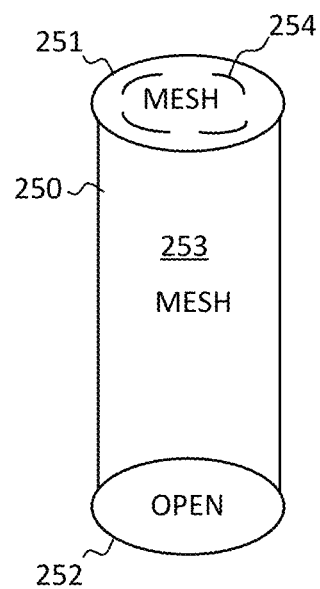
FIG. 25D shows a perspective view of an open basket holder, according to an exemplary embodiment of the present subject disclosure.

FIG. 25D shows a side perspective view of an exemplary coffee grinds or tea leaf holder 250 which is positioned within the basket 230. The holder 250 has a round top side 251, a round bottom side 252, and a cylindrical body 253. The top side 251 and cylindrical body 253 have a filter mesh (not shown). The bottom side 252 is open. In use, the holder 250 is filled with coffee grinds or tea leaves as desired, then inserted into internal basket 230. A basket lid 240 (see FIG. 14) is then threaded onto the basket 230, thereby securing the coffee grinds or tea leaves within the holder 250. One or more slits and/or holes 254 may be made at the top of the holder 250 to facilitate the escape of trapped air in the brewing steps.

Figure 26A:
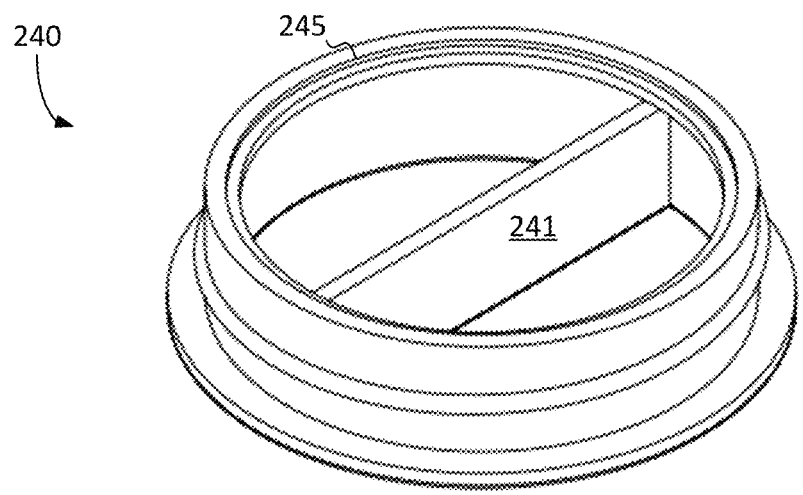
FIG. 26A shows a perspective view of a basket lid, according to an exemplary embodiment of the present subject disclosure.
Figure 26B:
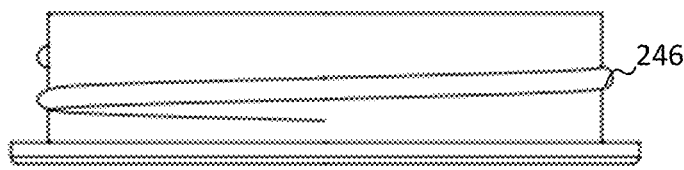
FIG. 26B shows a side view of a basket lid, according to an exemplary embodiment of the present subject disclosure.
Figure 26C:
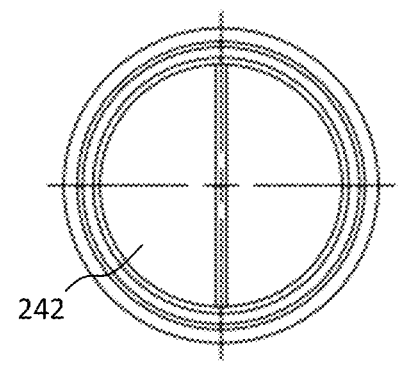
FIG. 26C shows a top view of a basket lid, according to an exemplary embodiment of the present subject disclosure.

FIGS. 26A, 26B, and 26C show side perspective, side, and top view of an open filtered internal basket lid. It has a cross-bar 241 for tightening and loosening and includes two large openings 242 that allow for maximum water flow during brewing. The basket lid threads 246 engage the basked threads 239 during assembly. A temporary filtration screen shelf 245 is included to allow manual installation of a disk of stainless-steel filtration mesh.

FIGS. 27-31 describe a brew device having a closed basket assembly which uses Le Chatelier's Principle to produce a high quality beverage.

Figure 27A:
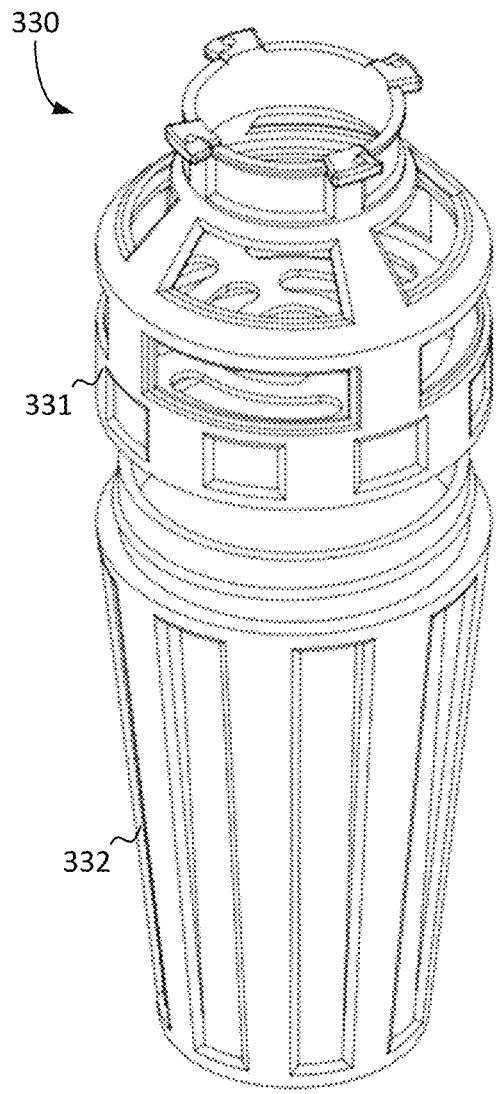
FIG. 27A shows a perspective view of a closed basket, according to an exemplary embodiment of the present subject disclosure.
Figure 27B:
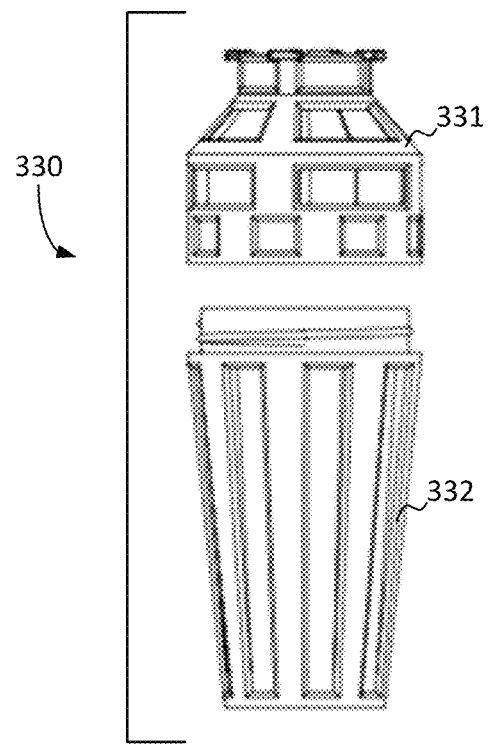
FIG. 27B shows an exploded side view of a closed basket, according to an exemplary embodiment of the present subject disclosure.
Figure 27C:
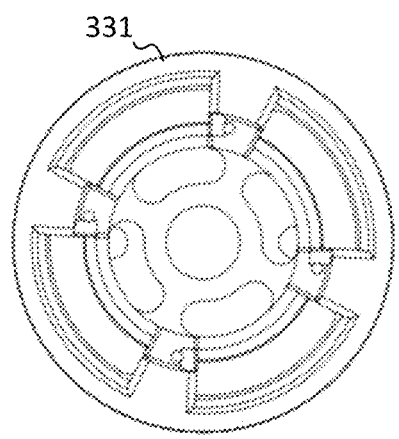
FIG. 27C shows a top view of a closed basket, according to an exemplary embodiment of the present subject disclosure.

FIGS. 27A, 27B, and 27C show side perspective view, exploded side view, and top view of a closed internal basket 330. Such an embodiment may be used for personal or commercial purposes. The basket assembly 330 includes a top portion 331 and a bottom portion 332, which are threaded together. The closed internal basket 330 does not have the open windows 231, 234 of the open basket design shown in the prior examples. Instead, there is a limited and controlled port area where water can access the coffee positioned within the basket 330, and a limited port where brewed coffee may exit the basket 330. This port area is similar in design to that described in the examples shown in FIGS. 8 and 10.

Figure 28A:
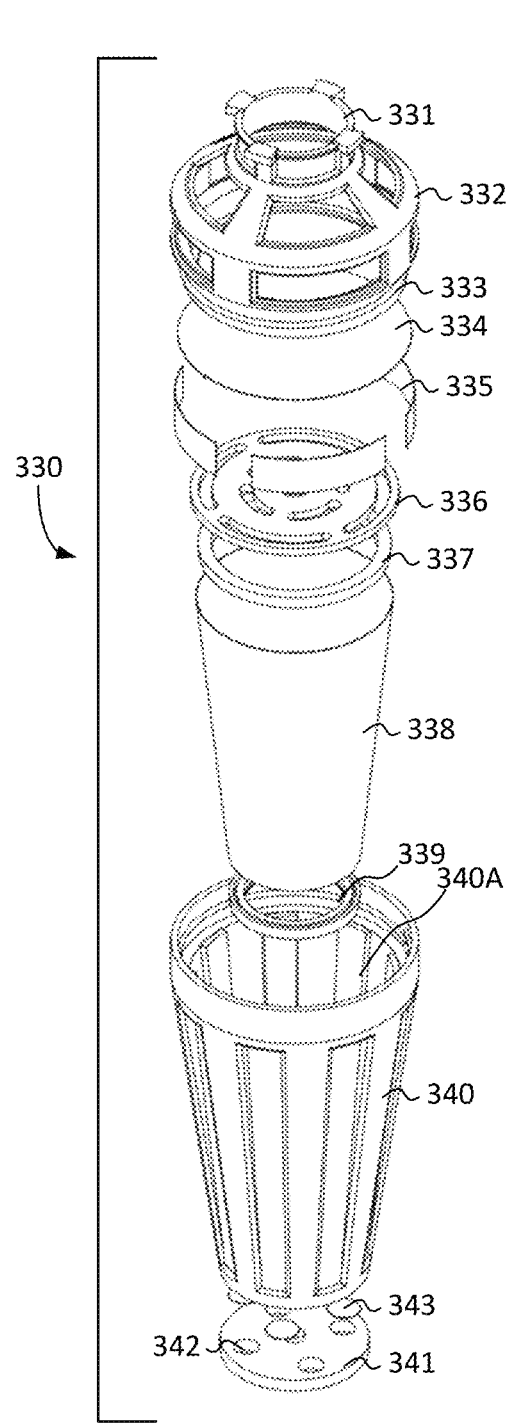
FIG. 28A shows an exploded perspective view of a closed basket, according to an exemplary embodiment of the present subject disclosure.
Figure 28B:
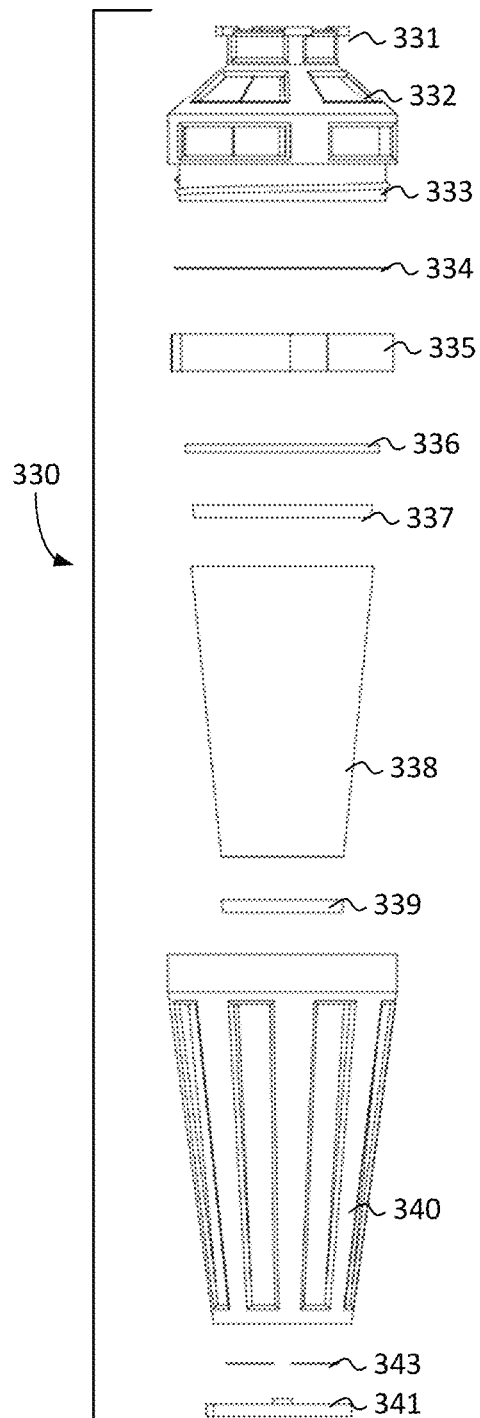
FIG. 28B shows an exploded side view of a closed basket, according to an exemplary embodiment of the present subject disclosure.

FIGS. 28A and 28B show an exploded side perspective view of a mug assembly 300, and an exploded side view of a mug assembly 300, respectively. The closed basket assembly 330 is shown. A top spacer 332 has a tab portion 331 that allows locking into a lid (not shown, but similar to those shown above in prior figures). The spacer 332 has a thread portion 333 that mates with a corresponding thread portion on the basket body portion 340. A horizontal stainless-steel filtration screen 334 sits vertically above the filtration windows, which contain stainless-steel filtration screens 335. An air escape disk 336 (see FIG. 29) fits into the bottom of the upper part 332 of the assembly and allows air to escape from the coffee grounds while minimizing the passage of cold brew-sized grounds. The conical filtration cartridge 338 is made from stainless-steel filtration screen and is supported by channeled ring end pieces 337, 339, with the bottom 339, smaller ring spanned by a stainless-steel filtration screen.

The closed basket housing 340 has a conical shape and recessed internal vertical ribs 340A which allow dissolved coffee products to fall vertically downward along the channels formed by the ribs as they are created, making room for new coffee products to be created. It has four exit holes 342 in the flow control disk 341, whose total cross-sectional area can be optimized in order to minimize friction, and/or maximize flow according to Toricelli's Law. The exit holes 342 are covered by small stainless-steel filtration screen disks 343 which sit in recessed grooves around the perimeter of the holes 342 on the bottom. A flow control disk 341 sits below the exit holes 342 and can be rotated to increase or decrease exposure to the basket's exit holes, allowing the user to regulate the rate at which coffee products exit the basket, and thus control the rate at which coffee is brewed.

Figure 29A:
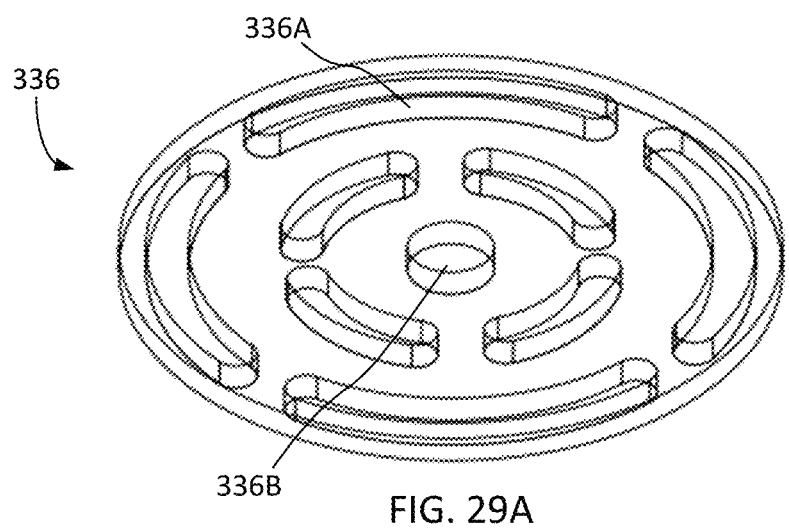
FIG. 29A shows a shadow perspective view of an air escape disk, according to an exemplary embodiment of the present subject disclosure.
Figure 29B:
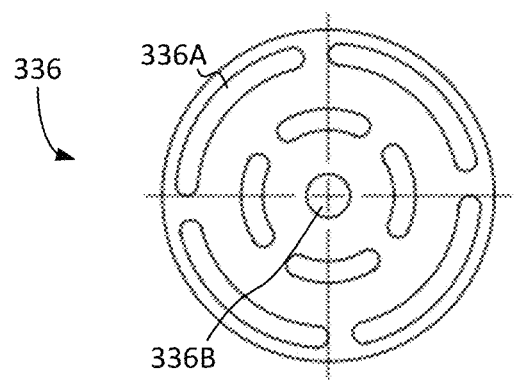
FIG. 29B shows a top view of an air escape disk, according to an exemplary embodiment of the present subject disclosure.

FIGS. 29A and 29B show a shadow side perspective view and a top view of an air escape disk 336, shown in place in FIG. 28. The air escape disk 236 (see FIG. 25A) is similar to the air escape disk 336 and shown in detail in FIG. 29. The disk 336 has arc-shaped apertures 336A and a center hole 336B which allow air to escape but which also minimize the passage of cold brew-sized grounds. The dimensions of the cuts 336A and center hole 336B have been determined experimentally. For example, the apertures 336A may be 1.59 mm but could range size from 1 mm to 2 mm. The center hole 336B may be, for example, 6.46 mm, but could range from 3.18 mm to 9.53 mm.

Figure 30A:
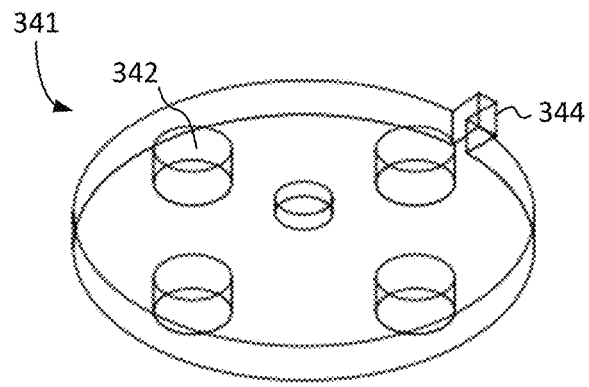
FIG. 30A shows a shadow perspective view of a flow control disk, according to an exemplary embodiment of the present subject disclosure.
Figure 30B:
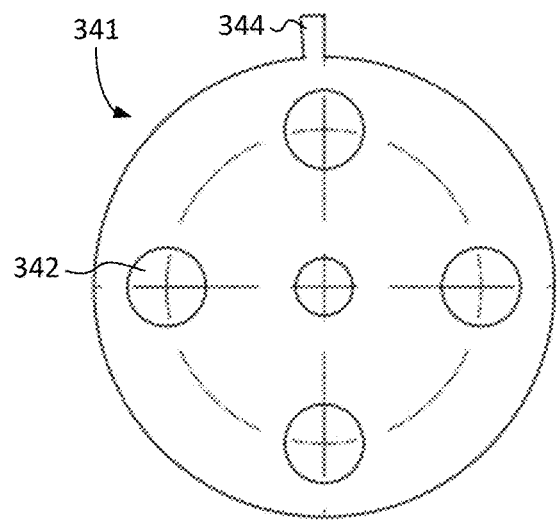
FIG. 30B shows a top view of a flow control disk, according to an exemplary embodiment of the present subject disclosure.
Figure 30C:
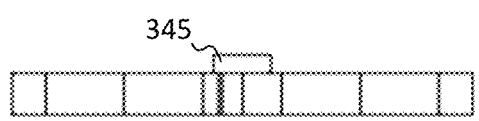
FIG. 30C shows a side view of a flow control disk, according to an exemplary embodiment of the present subject disclosure.

FIGS. 30A, 30B, and 30C show side perspective view, top view, and side view of a flow control disk 341. It has a protruding radial finger tab 344 that allows the user to manually rotate it. It has four exit holes 342 in the bottom, whose total cross-sectional area can be optimized in order to minimize friction and/or maximize flow rate and which match in size and position the exit holes in the bottom of the closed basket housing 340. The disk 341 is mounted to the housing 340 by a protruding axle nub 345 that fits into a recessed hole of the same shape in the bottom center of the closed basket housing 340.

Applicants have shown through numerous experiments that a closed basket system with a very limited brewed exit port openings (e.g., two exit holes 342 open) results in a high velocity brewing of coffee, and production of a high quality (high TDS) beverage, as measured by samples at the bottom of the container. It appears that a larger size for the exit hole 342 will decrease the speed and cause TDS to decrease, while a smaller size for the exit hole 342 will increase the speed and cause TDS to increase. The hole sizes may be, for example, 6 mm, but could range in size using the rotatable controller 341 anywhere from 1 mm to 9.53 mm.

Figure 31A:
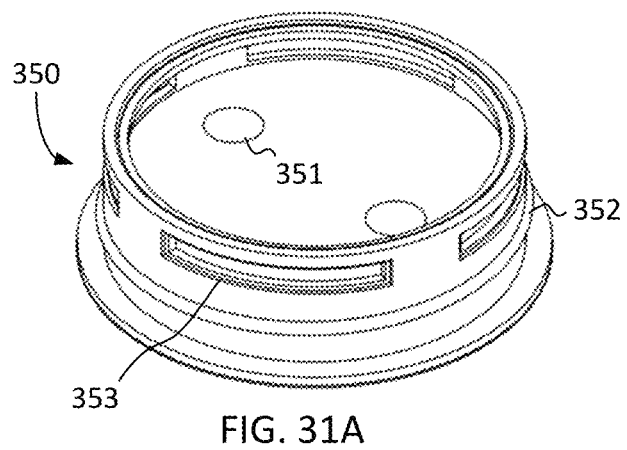
FIG. 31A shows a perspective view of an end cap having air windows on the side, according to an exemplary embodiment of the present subject disclosure.
Figure 31B:
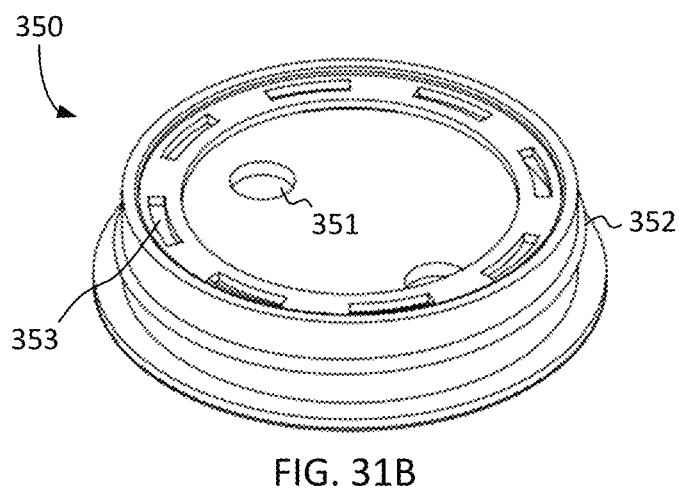
FIG. 31B shows a perspective view of an end cap having air windows on the top, according to an exemplary embodiment of the present subject disclosure.

FIGS. 31A and 31B provide side perspective views of two further exemplary embodiments of alternative lids 350 for housing basket 340. Each lid 350 has one or more holes 351, with filters positioned therein (not shown). A thread 352 allows the lid 350 to be threaded into the bottom portion of basket housing 340. Fluid windows 353 may be positioned horizontally (FIG. 31A) or vertically (FIG. 31B) to facilitate movement of air and fluids, and to drain the internal vertical ribs similar to 340A (see FIG. 28) which are the interior surface of basket housing 340 (see FIG. 33) to thereby enhance the rate of brewing.

Figure 32A:
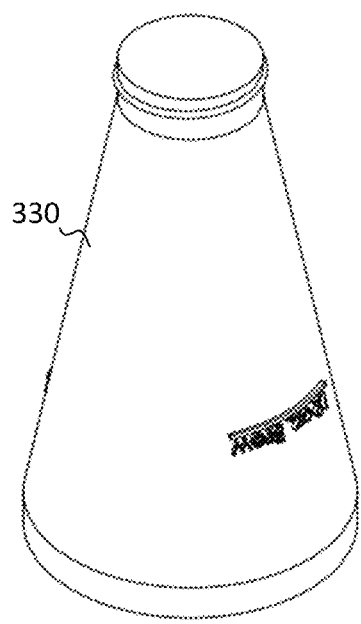
FIG. 32A shows a perspective view of a tapered container, according to an exemplary embodiment of the present subject disclosure.
Figure 32B:
FIG. 32B shows a side view of a tapered container, according to an exemplary embodiment of the present subject disclosure.
Figure 32C:
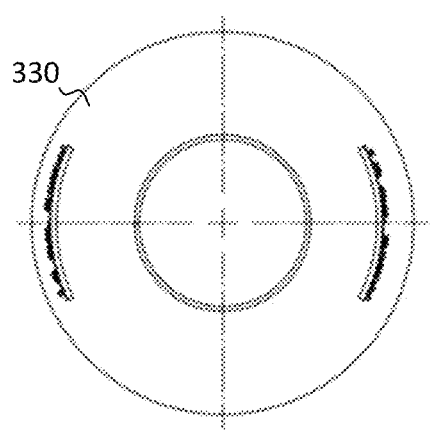
FIG. 32C shows a top view of a tapered container, according to an exemplary embodiment of the present subject disclosure.
Figure 33:
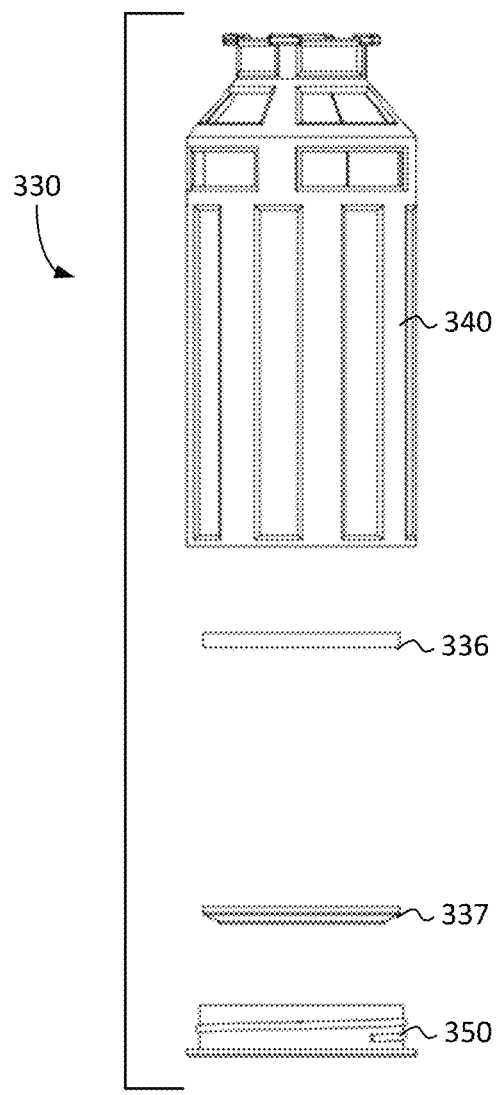
FIG. 33 shows an exploded side view of a basket, according to an exemplary embodiment of the present subject disclosure.

FIGS. 32-34 disclose additional exemplary embodiments which have different features and configurations as those shown and described in FIGS. 24-31. For sake of brevity, each of the embodiments of FIGS. 32-34 will not be described in detail, but only the features which are different will be shown and described in the figures and associated discussion.

FIGS. 32A, 32B, and 32C show side perspective view, side view, and top view of a closed internal basket 330. This embodiment is wider at the bottom to allow for easier filling of coffee/tea.

FIG. 33 shows a side view of a closed internal basket 230. This embodiment includes an air escape disk 336 and O-ring 337 that cap the ends of a cylinder of screen that can be filled from the bottom and capped with lid 350. O-ring 337 aligns vertically over fluid windows 353 (see FIG. 31) to allow fluid through fluid windows 353. The exemplary lids 350 shown in FIG. 31 are used as optional lids for the basket 330 shown in FIG. 33.

FIGS. 34A, 34B, and 34C show side perspective view, side view, and top view of a closed internal basket 330. This embodiment has an inner filter 359 that runs down through the center of the basket 340 to allow water flow through the center in addition to the sides.

FIGS. 35-38 describe various exemplary countertop versions of the brew systems, to be used for higher volume personal/commercial environments.

Figure 35A:
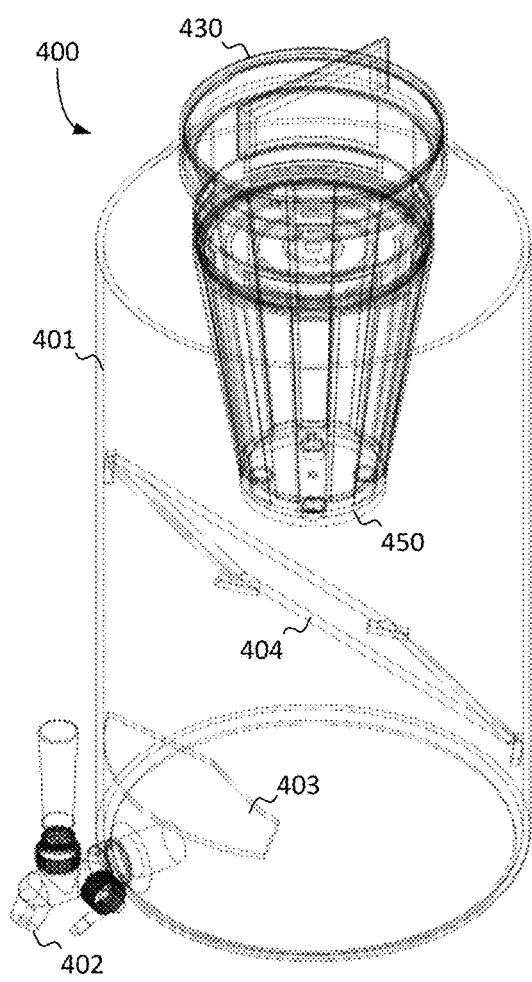
FIG. 35A shows a perspective view of a countertop brew system, according to an exemplary embodiment of the present subject disclosure.
Figure 35B:
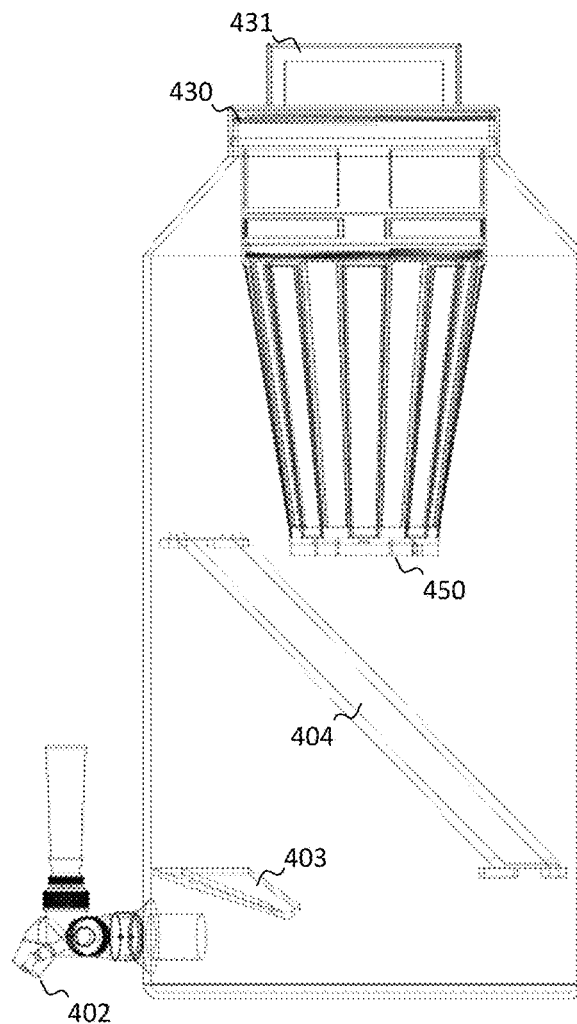
FIG. 35B shows a side view of a countertop brew system, according to an exemplary embodiment of the present subject disclosure.

FIGS. 35A and 35B show a side perspective view, and a side view, respectively, of a high volume beverage dispensing system 400. The closed basket assembly 430 is shown mounted inside a high volume brewing container 401. A drain valve 402 is mounted on the side, above which is mounted a baffle plate 403 meant to disrupt the formation of a vortex (and thus unwanted mixing) when the brewed beverage in the container 401 is being dispensed, either fully or partially, as servings of the brewed beverage are drawn off. Further, a sloped decline 404 allows a smooth flow of brewed coffee from the internal basket assembly 430 to the bottom of the brewing container 401 while minimizing the turbulence of the layer of dense brewed coffee resting at the bottom of container 401. A handle 430 provides for an easy removal of the basket assembly 430 for re-filling with coffee, washing, repairing, etc. The rate of flow of the brewed beverage is controlled by flow control disks 450 acting as end caps, similar to those described in FIGS. 18-19.

FIGS. 36A and 36B show a side perspective view, and a side view, respectively, of a high volume beverage dispensing system 500. The closed basket assembly 530 is shown mounted inside a high volume brewing container 501. A drain valve 502 is mounted on the side, and the shape of the bottom 503 of the container is for draining purposes. A vortex breaker 535 is located at the tip of the cone to disrupt the formation of a vortex (and thus unwanted mixing) when the brewed beverage in the container 401 is being drained, either fully or partially, as servings of the beverage are drawn off. Further, the conical plate 503 has a sloped decline 504 which allows a smooth flow of brewed coffee from the internal basket assembly 530 to the bottom of the brewing container 501 through tubing 505 while minimizing the turbulence of the layer of dense brewed coffee resting at the bottom of container 501. A handle 531 provides for an easy removal of the basket assembly 530 for re-filling with coffee, washing, repairing, etc. A vertical siphon tube 505 is attached to the basket's exit hole, and functions to both directly deposit coffee products on the bottom of the container, as well as maximize the pressure differential between the exit and the intake windows at the top, thus maximizing flow. A horizontal, circular impingement plate 536 at the bottom of the siphon dissipates kinetic energy of exiting coffee products (impingement jet) and thus minimizes turbulence, and also functions to restrict turbulence during draining through the drain valve 502. A vortex breaker 535 is included immediately at the tip of the conical plate to disrupt the formation of vortices during draining.

FIG. 36C provides a perspective view of an optional conical cap 532 which may be screwed onto the basket 530 through thread 534. This conical cap uses Toricelli's Law to minimize its volume near the exit. It also constricts flow at its exit causing accumulation of coffee products and maximizing exit velocity according to Toricelli's Law. These two features work together to force accumulated coffee products to be displaced upward, thereby maximizing the downward flow of brewed coffee, and increasing TDS. The apertures 533 about the periphery of the end cap allow for the continuous flow of downward drifting brewed beverage as it flows down the internal ribs 530A of the basket 530. Although shown specifically in this exemplary embodiment, the conical end cap 532 may be used in any of the embodiments shown and described here.

Figure 37:
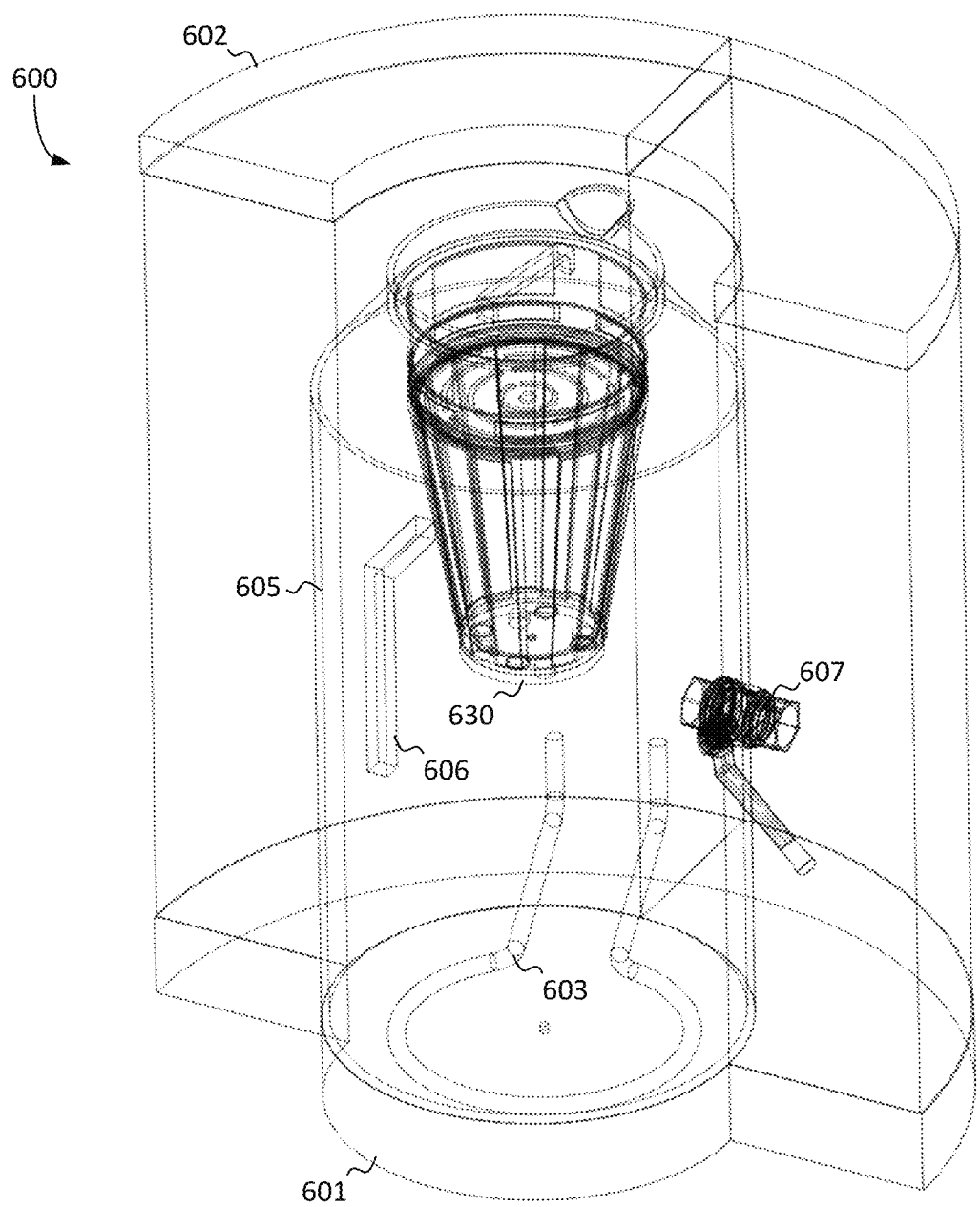
FIG. 37 shows a perspective view of a countertop brew system with removable pitcher, according to an exemplary embodiment of the present subject disclosure.

FIG. 37 shows another exemplary embodiment of a high volume beverage brew system 600 according to the present subject disclosure. In this system 600, there is a base 601 and a reservoir 602. The base 601 may contain a heating element 603 to provide optional heat to the bottom portion of a removable pitcher 605 having handle 606. The removable pitcher 605 serves as the brewing container and is adapted to house the internal basket 630. The removable pitcher 605 may be used to easily dispense brewed beverage from within the container. Optionally, a drain 607 may be used to drain out unbrewed or underbrewed fluid from the pitcher 605 before removing the pitcher 605 from the system 600. This way, the remaining beverage in the pitcher 605 is fully brewed and will not be diluted from underbrewed fluid resting atop the brewed beverage. This system 600 may be of any size and may be used for residential or commercial purposes.

Figure 38:
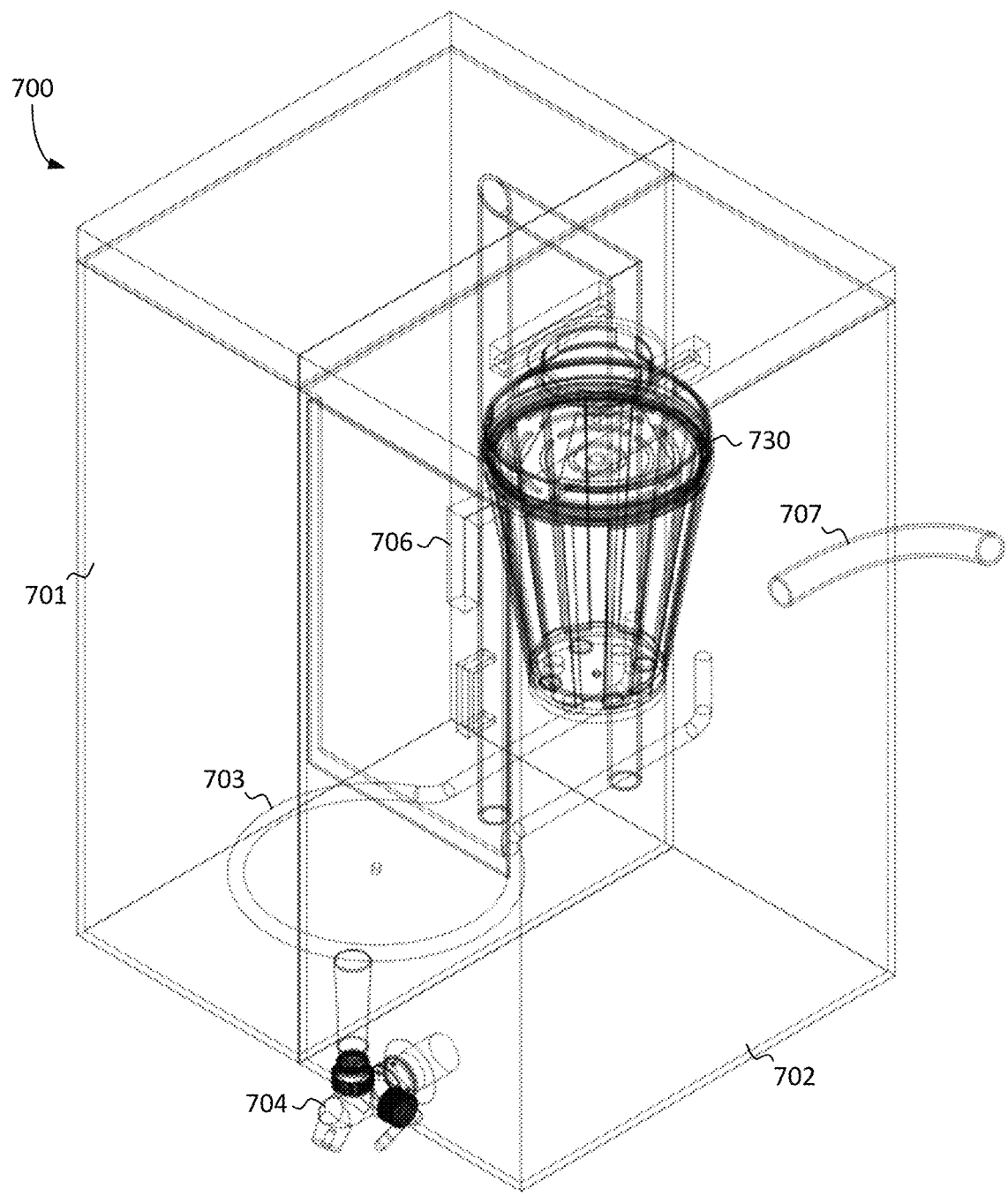
FIG. 38 shows a perspective view of a countertop brew system with automated control, according to an exemplary embodiment of the present subject disclosure.
Figure 39A:
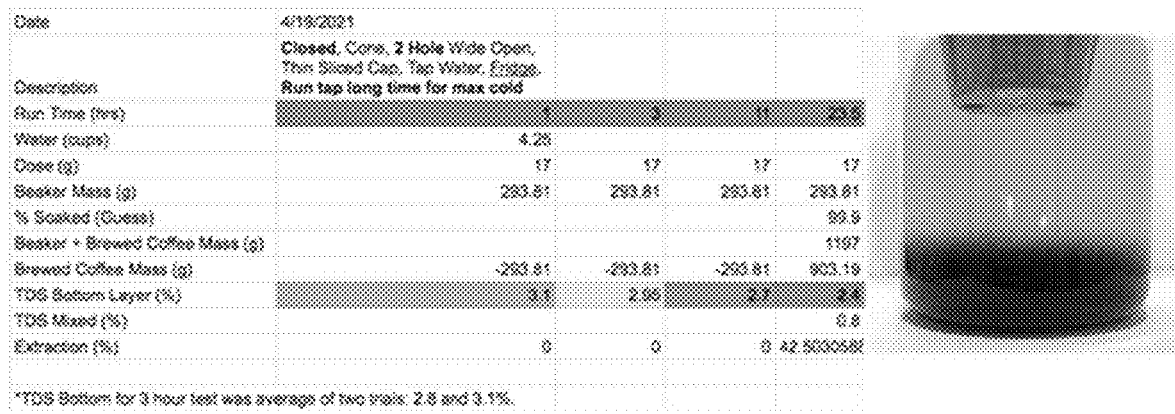
FIG. 39A shows testing of a closed brew system, according to an exemplary embodiment of the present subject disclosure.

FIG. 38 shows another exemplary embodiment of a beverage brew system 700 according to the present subject disclosure. In this system 700, there are two compartments, an unbrewed fluid reservoir 701 and a brewed beverage container 702. A heating element 703 may be used to heat the fluid before being used to brew. A removable internal basket 730 holds grounds or leaves for brewing. The internal basket 730 has a handle 706 to facilitate in removable and replacement. A dispenser 704 dispenses brewed beverage from the brew tank 702. Optionally, a drain 707 may be used to drain out unbrewed or underbrewed fluid from the brewed beverage tank 702. This way, the remaining beverage in the brewed beverage tank 702 is fully brewed and will not be diluted with underbrewed fluid resting atop the brewed beverage when the beverage is dispensed through the dispenser 704. This system 700 may be of any size and may be used for residential or commercial purposes. Because of the potentially large holding tanks, and the resultant weight, such a system may be permanently situated in a home or commercial setting.

Further, the system 700 may be automated through computer control (not shown) to ensure a steady supply of readily dispensable brewed beverage. A fluid sensor may be positioned at a desired height in the brewed beverage tank 702 to initiate the brewing process by pulling water in from the storage tank 701 whenever fluid drops below the desired level in the brewed tank 702. This ensures a steady supply of brewed beverage, which is very helpful in a commercial setting with a constant demand for the brewed beverage. A further sensor may indicate when the coffee grinds or tea leaves in the internal basket 730 should be changed to ensure a high quality beverage product.

TDS testing was performed on a simulated commercial design, similar to the embodiment shown in FIG. 35, minus the diagonal plate 404. As shown in the data chart and visual depiction shown in FIG. 39A, in testing aimed at creating the highest possible Total Dissolved Solids (TDS) in a simulation of a commercial version of the present design (medium sized container to maximize coffee/water ratio), it was discovered that gentle deposition of coffee products using two exit holes produced a concentration of coffee product that exceeded 3% TDS after one hour. This number decreased with time (attributed to Brownian Motion, convection currents and unintentional agitation/turbulence), but still doubled the TDS industry standard for cold brew (around 1.5%). Even after a long period of time (23.5 hours), the TDS of the coffee sitting at the bottom of the container was still significantly higher than the industry standard. The present commercial design is able to draw this coffee off without mixing it with the brewing water.

Figure 39B:
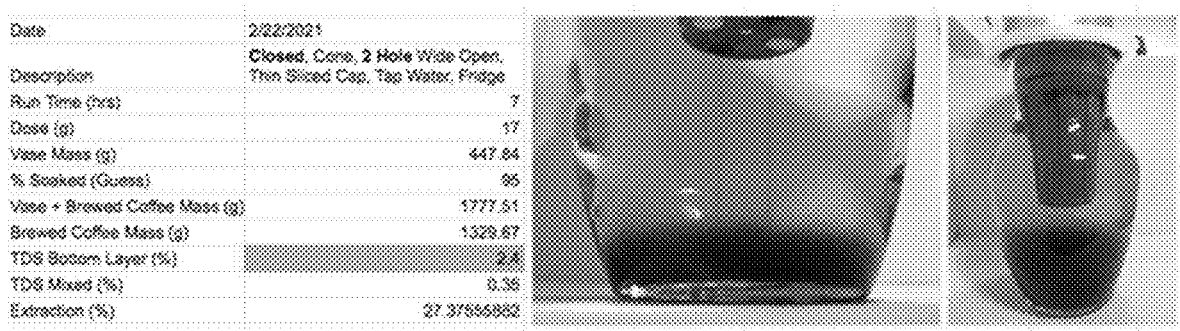
FIG. 39B shows testing of a closed brew system, according to an exemplary embodiment of the present subject disclosure.

As shown in the data chart and visual depiction shown in FIG. 39B, in testing aimed at creating the highest possible TDS in the simulation of a commercial version of the present design (large sized container to maximize clean brewing water), it was discovered that gentle deposition of coffee products using two exit holes produced a concentration of coffee product that was well above the industry standard for cold brew (around 1.5%) after 7 hours. The present commercial design is able to draw this coffee off without mixing it with brewing water.

Figure 39C:
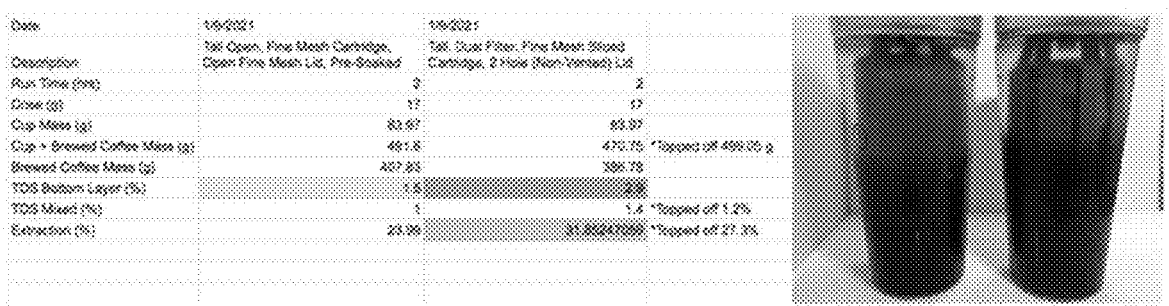
FIG. 39C shows comparison testing, according to an exemplary embodiment of the present subject disclosure.
Figure 40A:
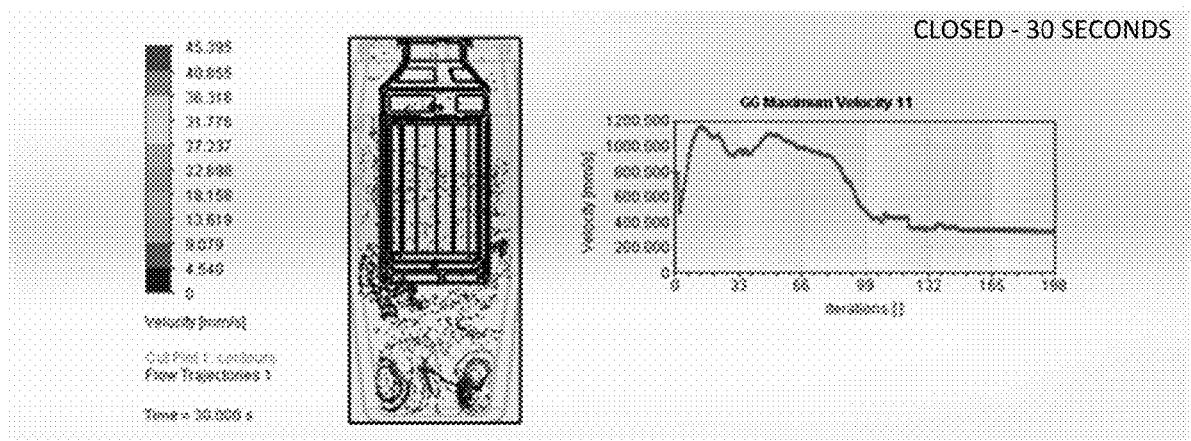
FIG. 40A shows simulation testing a closed system at 30 seconds, according to an exemplary embodiment of the present subject disclosure.
Figure 40B:
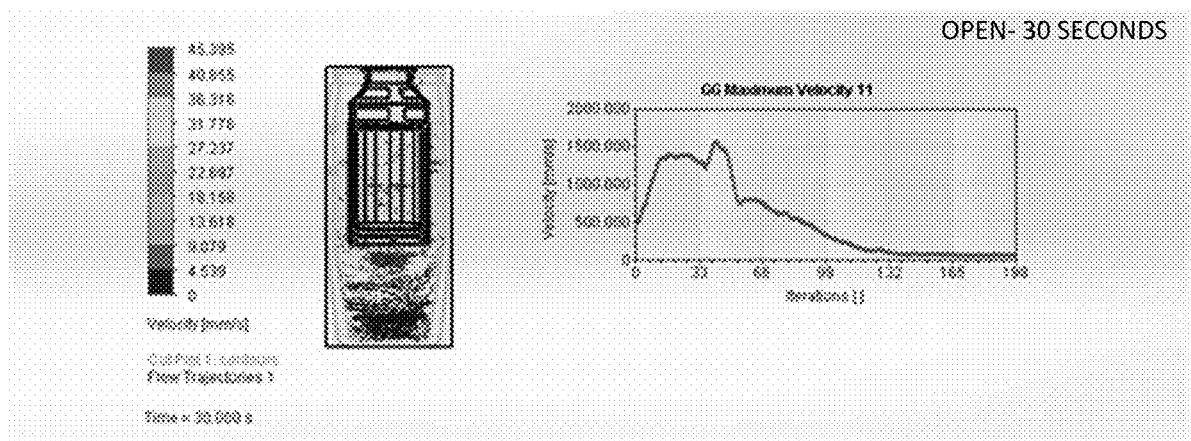
FIG. 40B shows simulation testing an open system at 30 seconds, according to an exemplary embodiment of the present subject disclosure.
Figure 41A:
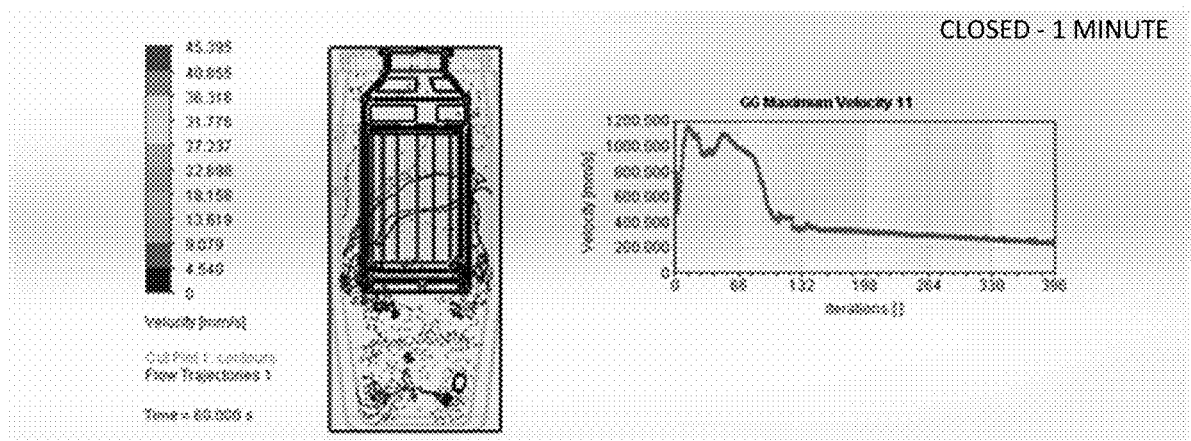
FIG. 41A shows simulation testing a closed system at 1 minute, according to an exemplary embodiment of the present subject disclosure.
Figure 41B:
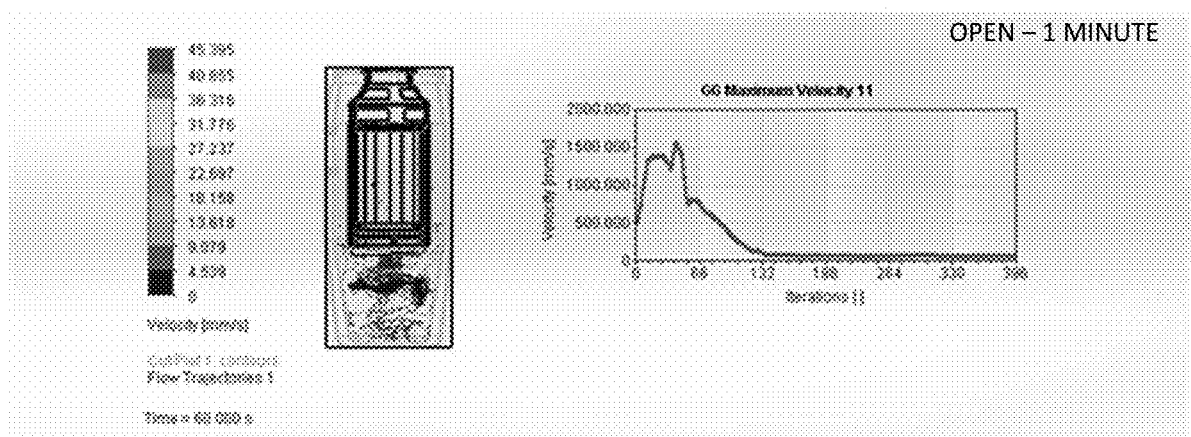
FIG. 41B shows simulation testing an open system at 1 minute, according to an exemplary embodiment of the present subject disclosure.
Figure 42A:
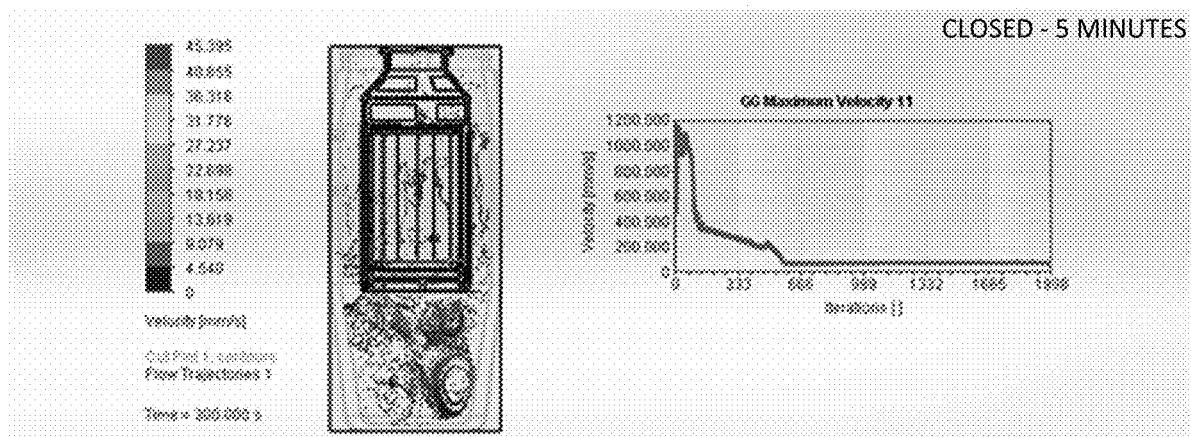
FIG. 42A shows simulation testing a closed system at 5 minutes, according to an exemplary embodiment of the present subject disclosure.
Figure 42B:
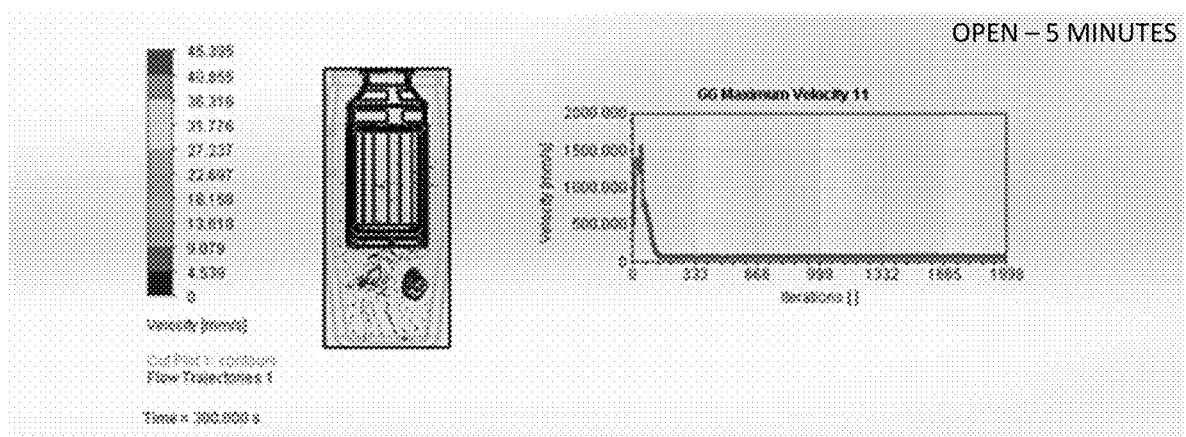
Figure 43A:
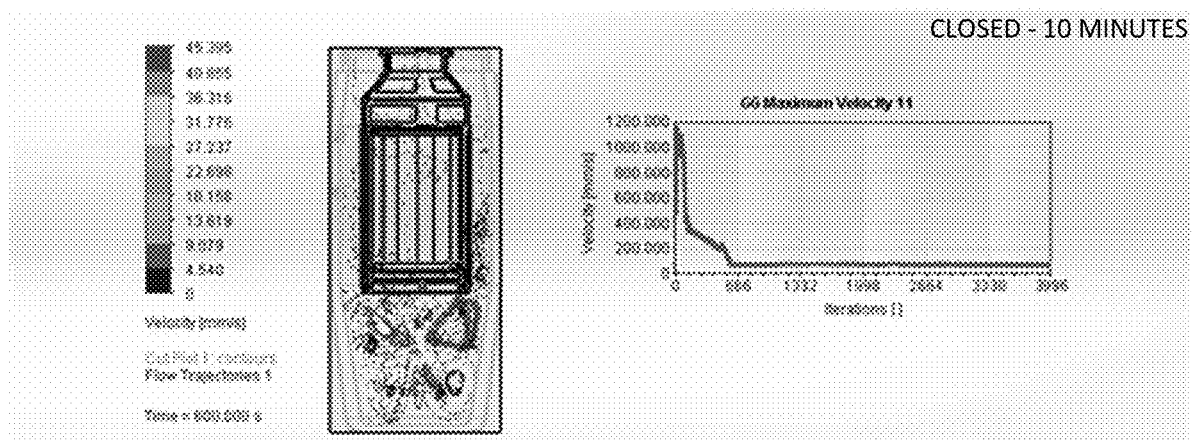
Figure 43B:
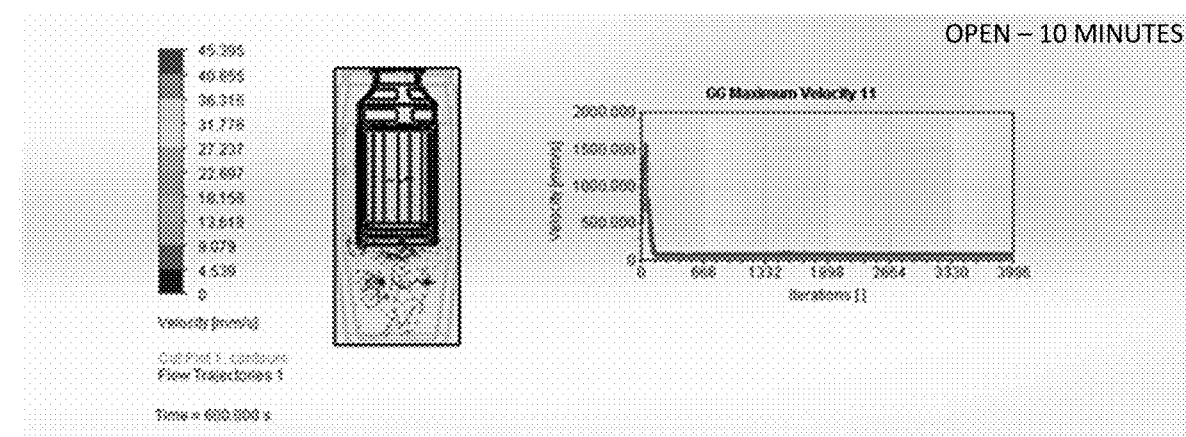
Figure 44A:
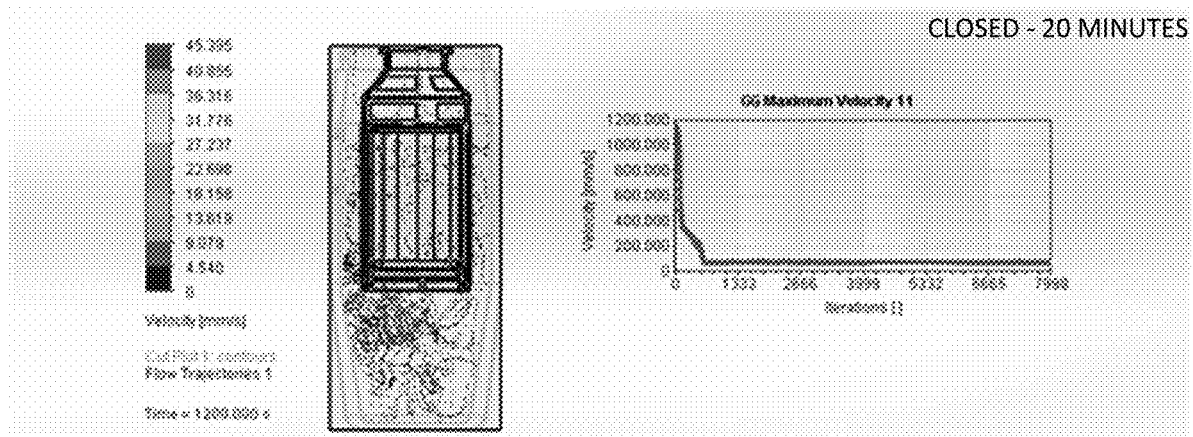
Figure 44B:
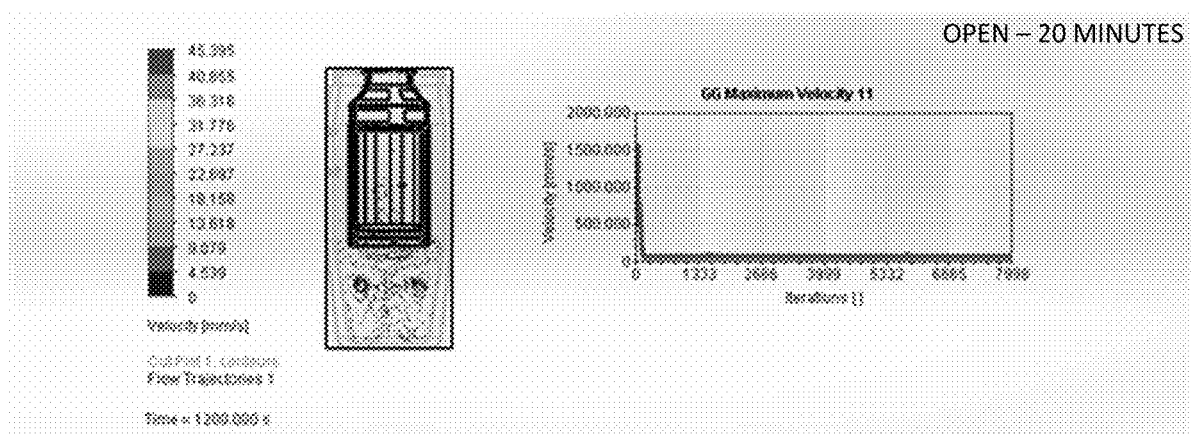

As shown in the data chart and visual depiction shown in FIG. 39C, in testing aimed at comparing the industry standard brewing method (submerged mesh bag or screened basket) to the present gravity-driven, constant flow method in the portable mug version of the design, it was discovered that in every case, the present design exceeded the TDS levels (bottom layer and mixed) of the simulated open basket industry standard design, and for tests of varying lengths.

In addition to the physical testing of the present novel closed brew method, a computer program was used to differentiate the present method with that of the typical open immersion method, which is to use a mesh basket submersed in water and not enclosed in any way. The computer program used was SOLIDWORKS Flow Simulation 2020. The main variables compared were the global goals (GG) of average velocity, bulk average velocity, maximum velocity and the minimum velocity for a reference point. A global goal is one that measures the value across the entirety of the fluid. The results of the simulation were that in every case the closed method had higher velocity values compared to the open method. The results are summarized in the table below.

TABLE 1

| GG measured between open basket and closed basket lids | | |
|---|---|---|
| Goal (Averaged Value) | tall- open basket- open lid | tall- closed basket- two hole lid |
| GG Minimum Velocity [mm/s] | 0.00 | 0.00 |
| GG Average Velocity [mm/s] | 8.95 | 9.36 |
| GG Maximum Velocity [mm/s] | 64.78 | 67.20 |
| GG Bulk Av Velocity [mm/s] | 8.85 | 9.33 |

Figure 45A:
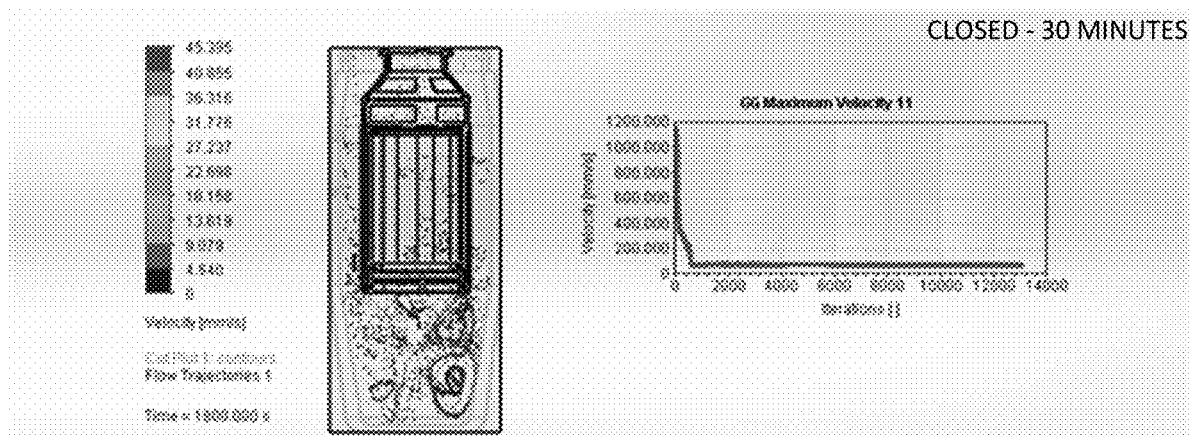
Figure 45B:
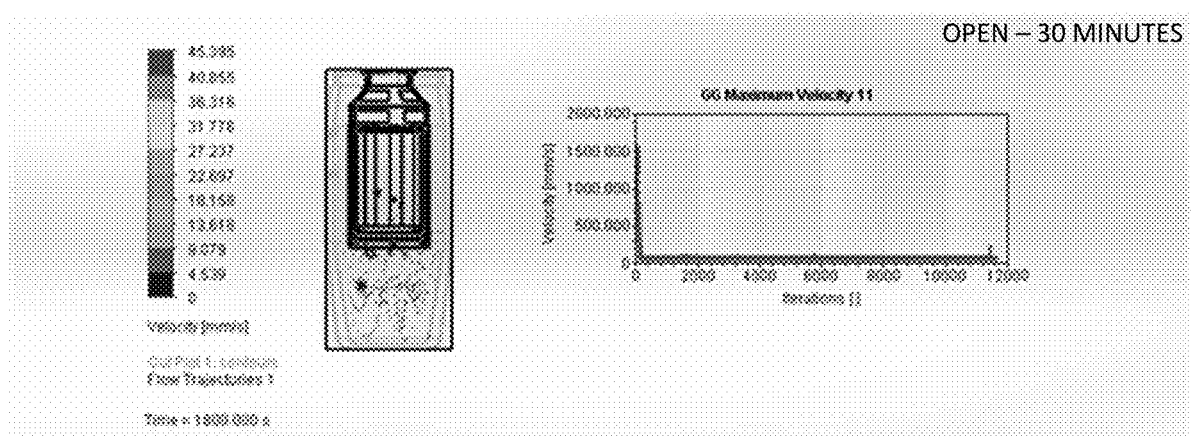

Snapshots of the simulation were recorded for open and close options at the intervals of 30 seconds (FIG. 40), 1 minute (FIG. 41), 5 minutes (FIG. 42), 10 minutes (FIG. 43), 20 minutes (FIG. 44), and 30 minutes (FIG. 45). The maximum velocity global goal was chosen to best demonstrate the differences between the two methods. It should be noted that the pictures of the fluid velocity are not representative of just the coffee but of the combined water and coffee flow.

An interpretation of the physical testing and the flow simulation results is as follows. The open immersion method allows the coffee to exit the basket and into the water on all sides and the bottom. The present cold brew method uses an inner mesh basket that is enclosed by a solid container. This solid container is ribbed to allow water to still access the coffee on all sides, but the solid container focuses the coffee down through the bottom of the basket. The coffee settles to the bottom of the container and is more concentrated because it wasn't able to exit through the sides. A pressure flow exists in both methods due to the coffee exiting the basket and additional water moving in to replace it. Since the coffee settles at the bottom in the closed method design, there is less resistance of water flow moving to replace the water that went into the coffee basket and exited as coffee. The less resistance would allow an increased velocity to occur in the closed basket design. Physical testing results have aligned with the flow simulation and demonstrated that the closed immersion brew method is faster at producing coffee than an open immersion method and it's more concentrated as well.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A brewing device for brewing beverages configured for use in a container using a disposable single serving container, the disposable single serving container comprise a bottom and a foil top, the brewing device, comprising:
   a basket assembly that comprises:
   a top holder that is adapted to receive the disposable single serving container;
   a spacer that is a lid to said top holder and holds said top holder at a depth inside the container when the container is filled with a liquid;
   a top slicer comprising at least one slicer knife mounted to the underside of said spacer such that securing said spacer to said top holder, moves said top slicer in a rotational motion through the foil top of the disposable single serving container, creating an opening in the foil top of the disposable single serving container accessible by a foil slice window and at least one slicer window of the top slicer that allows gas to escape and liquid to enter the disposable single serving container when the container is filled with liquid: and
   a needle positioned in said top holder wherein placing the disposable single serving container in said top holder and securing said spacer on said top holder, causes said needle to penetrate the bottom of the disposable single serving container to further allow gas to escape and liquid to enter when the container is filled with liquid;
   a bottom holder adapted to hold a second disposable single serving container securable underneath said top holder;
   wherein the top holder comprises a bottom slicer connected to the underside of the top holder and configured to engage with a top portion of a second disposable coffee cup which is housed within the bottom holder.

2. The brewing device in claim 1, wherein
the bottom slicer comprising at least one slicer knife positioned wherein securing said bottom holder to said top holder moves said bottom slicer in a rotational motion through the foil top of the second disposable single serving container, creating an opening in the foil top of the second disposable single serving container accessible by a foil slice window and at least one slicer window of the bottom slicer that allows gas to escape and liquid to enter the second disposable single serving container when the container is filled with liquid.

3. The brewing device in claim 2, further comprising:
a second needle positioned in said bottom holder wherein placing the second disposable single serving container in said bottom holder and securing said bottom holder on said top holder, causes said second needle to penetrate the bottom of the second disposable single serving container to further allow gas to escape and liquid to enter when the container is filled with liquid.

4. The brewing device of claim 2, wherein said bottom holder having a plurality of windows to allow liquid to enter said basket assembly.

5. The brewing device of claim 2, wherein the at least one slicer window of the bottom slicer comprises the plurality of slicer windows to allow liquid to enter said basket assembly.

6. The brewing device of claim 2, wherein the at least one slicer window of said bottom slicer has a single serve coffee cup slice window.

7. The brewing device of claim 2, wherein said bottom slicer has a center punch mechanism.

8. The brewing device of claim 2, wherein said bottom holder has access windows which allows the user to grasp the disposable single serving cup.

9. The brewing device of claim 2, wherein said foil slice window of the top slicer and the bottom slicer have a filter.

10. The brewing device of claim 2, wherein the at least one said slicer window of the top slicer and the at least one said slicer window of the bottom slicer have a filter.

11. The brewing device of claim 1, wherein said spacer having a plurality of windows to allow liquid to enter said basket assembly.

12. The brewing device of claim 1, wherein said top holder has a plurality of windows to allow liquid to penetrate the interior of said basket assembly.

13. The brewing device of claim 1, wherein the at least one slicer window of said top slicer comprises the plurality of slicer windows to allow liquid to enter said basket assembly.

14. The brewing device of claim 1, wherein said top slicer has a center punch mechanism.

15. The brewing device of claim 1, wherein said top holder has access window which allows the user to grasp the disposable single serving container.

16. The brewing device of claim 1, wherein said top slicer is a screw top that is secured to the top holder by rotating the top slicer.

17. The brewing device of claim 1, wherein said bottom slicer is a screw top that is secured to the bottom holder by rotating the bottom slicer.

* * * * *